(12) United States Patent
Boone

(10) Patent No.: US 9,015,585 B2
(45) Date of Patent: Apr. 21, 2015

(54) METHOD AND APPARATUS FOR PROVIDING PREDEFINED FEEDBACK

(71) Applicant: Barry Boone, San Jose, CA (US)

(72) Inventor: Barry Boone, San Jose, CA (US)

(73) Assignee: eBay Inc., San Jose, CA (US)

( * ) Notice: Subject to any disclaimer, the term of this patent is extended or adjusted under 35 U.S.C. 154(b) by 190 days.

(21) Appl. No.: 13/722,739

(22) Filed: Dec. 20, 2012

(65) Prior Publication Data

US 2013/0111364 A1    May 2, 2013

Related U.S. Application Data

(63) Continuation of application No. 09/740,502, filed on Dec. 19, 2000, now abandoned.

(51) Int. Cl.
*G06F 3/00* (2006.01)
*G06F 3/048* (2013.01)
*G06Q 10/10* (2012.01)
*G06Q 30/02* (2012.01)

(52) U.S. Cl.
CPC ............... *G06F 3/048* (2013.01); *G06Q 10/10* (2013.01); *G06Q 30/02* (2013.01)

(58) Field of Classification Search
USPC ................................................. 715/703, 751
See application file for complete search history.

(56) References Cited

U.S. PATENT DOCUMENTS

| | | | |
|---|---|---|---|
| 4,486,853 A | 12/1984 | Parsons | |
| 4,864,516 A | 9/1989 | Gaither et al. | |
| 5,136,501 A | 8/1992 | Silverman et al. | |
| 5,168,446 A | 12/1992 | Wiseman | |
| 5,205,200 A | 4/1993 | Wright | |
| 5,243,515 A | 9/1993 | Lee | |
| 5,258,908 A | 11/1993 | Hartheimer et al. | |
| 5,280,422 A | 1/1994 | Moe et al. | |
| 5,285,496 A | 2/1994 | Frank et al. | |
| 5,297,031 A | 3/1994 | Gutterman et al. | |
| 5,297,032 A | 3/1994 | Trojan et al. | |
| 5,305,200 A | 4/1994 | Hartheimer et al. | |

(Continued)

FOREIGN PATENT DOCUMENTS

| | | |
|---|---|---|
| CA | 2253543 A1 | 3/1997 |
| FR | 2658635 A1 | 8/1991 |

(Continued)

OTHER PUBLICATIONS

"@Home Network Names buydirect.com as Its Online Software Retailer", PR Newswire; New York, (Nov. 16, 1998), 3 pages.

(Continued)

*Primary Examiner* — Omar Abdul-Ali
(74) *Attorney, Agent, or Firm* — Schwegman Lundberg & Woessner, P.A.

(57) ABSTRACT

A method and apparatus utilized in operating a feedback forum in an online auction environment is described. Instead of allowing users of the system to enter free-form comments for and about other users, a number of predefined feedback comments are provided that relate to an auction transaction. Users leaving feedback for other users are permitted to select a comment they desire to leave for or about another user relative to a transaction. The predefined feedback comments selected by the users are associated with the users whom the comment is about, and at some time thereafter, the predefined feedback comment is displayed for viewing by other users of the system.

20 Claims, 13 Drawing Sheets

(56) References Cited

U.S. PATENT DOCUMENTS

| | | |
|---|---|---|
| 5,325,297 A | 6/1994 | Bird et al. |
| 5,329,589 A | 7/1994 | Fraser et al. |
| 5,375,055 A | 12/1994 | Togher et al. |
| 5,394,324 A | 2/1995 | Clearwater |
| 5,416,903 A * | 5/1995 | Malcolm .................. 715/703 |
| 5,485,510 A | 1/1996 | Colbert |
| 5,537,618 A | 7/1996 | Boulton et al. |
| 5,557,728 A | 9/1996 | Garrett et al. |
| 5,566,291 A | 10/1996 | Boulton et al. |
| 5,583,763 A | 12/1996 | Atcheson et al. |
| 5,596,994 A | 1/1997 | Bro |
| 5,598,557 A | 1/1997 | Doner et al. |
| 5,657,389 A | 8/1997 | Houvener |
| 5,659,366 A | 8/1997 | Kerman |
| 5,669,877 A | 9/1997 | Blomquist |
| 5,678,041 A | 10/1997 | Baker et al. |
| 5,694,546 A | 12/1997 | Reisman |
| 5,703,624 A | 12/1997 | van Kruistum |
| 5,706,457 A | 1/1998 | Dwyer et al. |
| 5,706,493 A | 1/1998 | Sheppard, II |
| 5,706,507 A | 1/1998 | Schloss |
| 5,708,829 A | 1/1998 | Kadashevich et al. |
| 5,715,314 A | 2/1998 | Payne et al. |
| 5,722,418 A | 3/1998 | Bro |
| 5,732,954 A | 3/1998 | Strickler et al. |
| 5,737,479 A | 4/1998 | Fujinami |
| 5,754,939 A | 5/1998 | Herz et al. |
| 5,760,917 A | 6/1998 | Sheridan |
| 5,761,655 A | 6/1998 | Hoffman |
| 5,771,291 A | 6/1998 | Newton et al. |
| 5,771,380 A | 6/1998 | Tanaka et al. |
| 5,774,121 A | 6/1998 | Stiegler |
| 5,778,135 A | 7/1998 | Otteson et al. |
| 5,781,246 A | 7/1998 | Alten et al. |
| 5,787,253 A | 7/1998 | McCreery et al. |
| 5,790,426 A | 8/1998 | Robinson |
| 5,790,790 A | 8/1998 | Smith et al. |
| 5,793,027 A | 8/1998 | Baik |
| 5,794,237 A | 8/1998 | Gore, Jr. |
| 5,799,285 A | 8/1998 | Klingman |
| 5,799,304 A | 8/1998 | Miller |
| 5,803,500 A | 9/1998 | Mossberg |
| 5,809,482 A | 9/1998 | Strisower |
| 5,810,771 A | 9/1998 | Blomquist |
| 5,822,123 A | 10/1998 | Davis et al. |
| 5,828,419 A | 10/1998 | Bruette et al. |
| 5,830,068 A | 11/1998 | Brenner et al. |
| 5,832,472 A | 11/1998 | Sheppard, II |
| 5,835,896 A | 11/1998 | Fisher et al. |
| 5,845,265 A | 12/1998 | Woolston |
| 5,845,266 A | 12/1998 | Lupien et al. |
| 5,848,396 A | 12/1998 | Gerace |
| 5,850,442 A | 12/1998 | Muftic |
| 5,862,230 A | 1/1999 | Darby |
| 5,867,799 A | 2/1999 | Lang et al. |
| 5,870,744 A | 2/1999 | Sprague |
| 5,872,848 A | 2/1999 | Romney et al. |
| 5,872,850 A | 2/1999 | Klein et al. |
| 5,873,069 A | 2/1999 | Reuhl et al. |
| 5,884,056 A | 3/1999 | Steele |
| 5,890,138 A | 3/1999 | Godin et al. |
| 5,905,974 A | 5/1999 | Fraser et al. |
| 5,905,975 A | 5/1999 | Ausubel |
| 5,922,074 A | 7/1999 | Richard et al. |
| 5,924,072 A | 7/1999 | Havens |
| 5,926,794 A | 7/1999 | Fethe |
| 5,944,790 A | 8/1999 | Levy |
| 5,950,172 A | 9/1999 | Klingman |
| 5,970,469 A | 10/1999 | Scroggie et al. |
| 5,974,412 A | 10/1999 | Hazlehurst et al. |
| 5,991,739 A | 11/1999 | Cupps et al. |
| 6,029,141 A | 2/2000 | Bezos et al. |
| 6,035,402 A | 3/2000 | Vaeth et al. |
| 6,044,363 A | 3/2000 | Mori et al. |
| 6,047,264 A | 4/2000 | Fisher et al. |
| 6,052,723 A | 4/2000 | Ginn |
| 6,055,518 A | 4/2000 | Franklin et al. |
| 6,058,417 A | 5/2000 | Hess et al. |
| 6,061,448 A | 5/2000 | Smith et al. |
| 6,064,980 A | 5/2000 | Jacobi et al. |
| 6,066,075 A | 5/2000 | Poulton |
| 6,070,145 A | 5/2000 | Pinsley et al. |
| 6,073,117 A | 6/2000 | Oyanagi et al. |
| 6,073,138 A | 6/2000 | de l'Etraz et al. |
| 6,085,176 A | 7/2000 | Woolston |
| 6,092,049 A | 7/2000 | Chislenko et al. |
| 6,101,489 A | 8/2000 | Lannert et al. |
| 6,104,815 A | 8/2000 | Alcorn et al. |
| 6,112,186 A | 8/2000 | Bergh et al. |
| 6,119,078 A * | 9/2000 | Kobayakawa et al. ............ 704/3 |
| 6,119,137 A | 9/2000 | Smith et al. |
| 6,122,666 A * | 9/2000 | Beurket et al. .................. 709/226 |
| 6,134,548 A | 10/2000 | Gottsman |
| 6,141,653 A | 10/2000 | Conklin et al. |
| 6,148,299 A | 11/2000 | Yoshimoto |
| 6,161,099 A | 12/2000 | Harrington et al. |
| 6,178,408 B1 | 1/2001 | Copple et al. |
| 6,189,029 B1 | 2/2001 | Fuerst |
| 6,192,407 B1 | 2/2001 | Smith et al. |
| 6,199,049 B1 | 3/2001 | Conde et al. |
| 6,202,051 B1 | 3/2001 | Woolston |
| 6,236,975 B1 | 5/2001 | Boe et al. |
| 6,236,977 B1 | 5/2001 | Verba et al. |
| 6,237,059 B1 | 5/2001 | Dean et al. |
| 6,243,691 B1 | 6/2001 | Fisher et al. |
| 6,266,649 B1 | 7/2001 | Linden et al. |
| 6,275,811 B1 | 8/2001 | Ginn |
| 6,292,769 B1 * | 9/2001 | Flanagan et al. .................. 704/3 |
| 6,311,190 B1 | 10/2001 | Bayer et al. |
| 6,313,833 B1 | 11/2001 | Knight |
| 6,321,221 B1 | 11/2001 | Bieganski |
| 6,327,574 B1 | 12/2001 | Kramer et al. |
| 6,352,479 B1 | 3/2002 | Sparks, II |
| 6,374,290 B1 | 4/2002 | Scharber et al. |
| 6,396,472 B1 | 5/2002 | Jacklin |
| 6,405,159 B2 | 6/2002 | Bushey et al. |
| 6,405,175 B1 | 6/2002 | Ng |
| 6,415,270 B1 * | 7/2002 | Rackson et al. ............ 705/36 R |
| 6,466,917 B1 | 10/2002 | Goyal et al. |
| 6,466,918 B1 | 10/2002 | Spiegel et al. |
| 6,477,509 B1 | 11/2002 | Hammons et al. |
| 6,484,153 B1 | 11/2002 | Walker et al. |
| 6,493,703 B1 | 12/2002 | Knight et al. |
| 6,505,201 B1 | 1/2003 | Haitsuka et al. |
| 6,523,037 B1 | 2/2003 | Monahan et al. |
| 6,539,392 B1 | 3/2003 | Rebane |
| 6,601,759 B2 | 8/2003 | Fife et al. |
| 6,615,258 B1 | 9/2003 | Barry et al. |
| 6,697,824 B1 | 2/2004 | Bowman-Amuah |
| 6,856,963 B1 | 2/2005 | Hurwitz |
| 6,859,783 B2 | 2/2005 | Cogger et al. |
| 6,952,678 B2 | 10/2005 | Williams et al. |
| 7,024,383 B1 * | 4/2006 | Mancini et al. .................. 705/35 |
| 7,177,836 B1 | 2/2007 | German et al. |
| 7,428,505 B1 | 9/2008 | Levy et al. |
| 7,433,832 B1 | 10/2008 | Bezos et al. |
| 7,587,359 B2 | 9/2009 | Levy et al. |
| 7,778,890 B1 | 8/2010 | Bezos et al. |
| 8,290,809 B1 | 10/2012 | Ratterman et al. |
| 8,612,297 B2 | 12/2013 | Levy et al. |
| 8,635,098 B2 | 1/2014 | Ratterman et al. |
| 2001/0029455 A1 | 10/2001 | Chin et al. |
| 2001/0037206 A1 | 11/2001 | Falk et al. |
| 2001/0037253 A1 | 11/2001 | Kensey |
| 2001/0047290 A1 | 11/2001 | Petras et al. |
| 2002/0007338 A1 | 1/2002 | Cuong et al. |
| 2002/0069200 A1 | 6/2002 | Cooper et al. |
| 2002/0082989 A1 | 6/2002 | Fife et al. |
| 2002/0095305 A1 | 7/2002 | Gakidis et al. |
| 2002/0118225 A1 | 8/2002 | Miksovsky |
| 2002/0138402 A1 | 9/2002 | Zacharia et al. |
| 2003/0014318 A1 * | 1/2003 | De La Motte et al. .......... 705/26 |
| 2003/0131232 A1 | 7/2003 | Fraser et al. |
| 2003/0167209 A1 | 9/2003 | Hsieh |

(56) References Cited

U.S. PATENT DOCUMENTS

| | | |
|---|---|---|
| 2004/0128155 A1 | 7/2004 | Vaidyanathan et al. |
| 2004/0169678 A1 | 9/2004 | Oliver |
| 2004/0210550 A1 | 10/2004 | Williams et al. |
| 2004/0225577 A1 | 11/2004 | Robinson |
| 2004/0243527 A1 | 12/2004 | Gross |
| 2004/0243604 A1 | 12/2004 | Gross |
| 2004/0267604 A1 | 12/2004 | Gross |
| 2005/0125826 A1 | 6/2005 | Hunleth et al. |
| 2005/0182660 A1 | 8/2005 | Henley |
| 2007/0208454 A1 | 9/2007 | Forrester et al. |
| 2008/0065994 A1 | 3/2008 | Wang et al. |
| 2008/0320049 A1 | 12/2008 | Levy et al. |
| 2011/0231530 A1 | 9/2011 | Veres et al. |
| 2012/0054070 A1 | 3/2012 | Flubr et al. |
| 2012/0089410 A1 | 4/2012 | Mikurak |
| 2013/0041717 A1 | 2/2013 | Ratterman et al. |
| 2014/0082063 A1 | 3/2014 | Levy et al. |
| 2014/0136367 A1 | 5/2014 | Ratterman et al. |
| 2014/0249956 A1 | 9/2014 | Ratterman et al. |
| 2014/0258033 A1 | 9/2014 | Ratterman et al. |
| 2014/0258034 A1 | 9/2014 | Ratterman et al. |
| 2014/0258035 A1 | 9/2014 | Ratterman et al. |
| 2014/0258036 A1 | 9/2014 | Ratterman et al. |
| 2014/0258171 A1 | 9/2014 | Ratterman et al. |

FOREIGN PATENT DOCUMENTS

| | | |
|---|---|---|
| JP | 2005010978 A | 1/2005 |
| NL | 9300266 A | 9/1994 |
| WO | WO-9517711 A1 | 6/1995 |
| WO | WO-9963461 A1 | 12/1999 |
| WO | WO-0165338 A3 | 9/2001 |
| WO | WO-03010621 A2 | 2/2003 |
| WO | WO-03010621 A3 | 2/2003 |

OTHER PUBLICATIONS

"U.S. Appl. No. 09/412,893, Advisory Action mailed May 19, 2003", 3 pgs.
"U.S. Appl. No. 09/412,893, Advisory Action mailed Jun. 19, 2006", 3 pgs.
"U.S. Appl. No. 09/412,893, Advisory Action mailed Oct. 11, 2005", 3 pgs.
"U.S. Appl. No. 09/412,893, Appeal Brief filed Aug. 2, 2006", 26 pgs.
"U.S. Appl. No. 09/412,893, Final Office Action mailed Jan. 6, 2003", 8 pgs.
"U.S. Appl. No. 09/412,893, Non Final Office Action mailed Sep. 9, 2002", 7 pgs.
"U.S. Appl. No. 09/412,893, Non-Final Office Action mailed Jul. 20, 2009", 2 pgs.
"U.S. Appl. No. 09/412,893, Preliminary Amendment filed Sep. 8, 2003", 23 pgs.
"U.S. Appl. No. 09/412,893, Preliminary Amendment filed Oct. 5, 1999", 1 pg.
"U.S. Appl. No. 09/412,893, Response filed May 6, 2003 to Final Office Action mailed Jan. 6, 2003", 4 pgs.
"U.S. Appl. No. 09/412,893, Response filed Jun. 4, 2004 to Final Office Action mailed Feb. 17, 2004", 15 pgs.
"U.S. Appl. No. 09/412,893, Response filed Dec. 9, 2002 to Non Final Office Action mailed Sep. 9, 2002", 6 pgs.
"U.S. Appl. No. 09/412,893, Supplemental Preliminary Amendment filed May 3, 2000", 7 pgs.
"U.S. Appl. No. 09/503,960, Advisory Action mailed Jul. 18, 2003", 5 pgs.
"U.S. Appl. No. 09/503,960, Advisory Action mailed Jul. 30, 2004", 4 pgs.
"U.S. Appl. No. 09/503,960, Appeal Brief filed Jan. 16, 2007", 30 pgs.
"U.S. Appl. No. 09/503,960, Appeal Brief filed May 23, 2007", 33 pgs.
"U.S. Appl. No. 09/503,960, Appeal Brief filed Jul. 12, 2007", 6 pgs.
"U.S. Appl. No. 09/503,960, Final Office Action mailed Mar. 22, 2011", 21 pgs.
"U.S. Appl. No. 09/503,960, Non Final Office Action mailed Sep. 28, 2011", 29 pgs.
"U.S. Appl. No. 09/503,960, Non-Final Office Action mailed Jul. 14, 2010", 21 pgs.
"U.S. Appl. No. 09/503,960, Notice of Allowance mailed Feb. 29, 2012", 22 pgs.
"U.S. Appl. No. 09/503,960, Notice of Allowance mailed Jun. 15, 2012", 10 pgs.
"U.S. Appl. No. 09/503,960, Pre-Appeal Brief Request filed Aug. 14, 2006", 4 pgs.
"U.S. Appl. No. 09/503,960, Preliminary Amendment filed Aug. 20, 2003", 13 pgs.
"U.S. Appl. No. 09/503,960, Reply Brief filed Dec. 11, 2007", 7 pgs.
"U.S. Appl. No. 09/503,960, Response filed Jan. 30, 2012 to Non Final Office Action mailed Sep. 28, 2011", 18 pgs.
"U.S. Appl. No. 09/503,960, Response filed Feb. 19, 2004 to Non Final Office Action mailed Nov. 19, 2003", 14 pgs.
"U.S. Appl. No. 09/503,960, Response filed May 23, 2011 to Final Office Action mailed Mar. 22, 2011", 16 pgs.
"U.S. Appl. No. 09/503,960, Response filed Oct. 14, 2010 to Non Final Office Action mailed Jul. 14, 2010", 18 pgs.
"U.S. Appl. No. 09/515,575, 312 Amendment filed Jun. 4, 2007", 12 pgs.
"U.S. Appl. No. 09/515,575, Advisory Action mailed Mar. 22, 2004", 2 pgs.
"U.S. Appl. No. 09/515,575, Advisory Action mailed Dec. 12, 2006", 3 pgs.
"U.S. Appl. No. 09/515,575, Examiner Interview Summary and Supplemental Amendment filed Oct. 4, 2007", 10 pgs.
"U.S. Appl. No. 09/515,575, Examiner Interview Summary mailed Apr. 17, 2003", 2 pgs.
"U.S. Appl. No. 09/515,575, Examiner Interview Summary mailed Aug. 13, 2002", 12 pgs.
"U.S. Appl. No. 09/515,575, Examiner Interview Summary mailed Sep. 6, 2007", 3 pgs.
"U.S. Appl. No. 09/515,575, Final Office Action mailed May 22, 2002", 18 pgs.
"U.S. Appl. No. 09/515,575, Final Office Action mailed Sep. 22, 2006", 17 pgs.
"U.S. Appl. No. 09/515,575, Final Office Action mailed Dec. 17, 2003", 15 pgs.
"U.S. Appl. No. 09/515,575, Non Final Office Action mailed Mar. 21, 2006", 17 pgs.
"U.S. Appl. No. 09/515,575, Non Final Office Action mailed Jul. 13, 2004", 6 pgs.
"U.S. Appl. No. 09/515,575, Non Final Office Action mailed Jul. 18, 2001", 15 pgs.
"U.S. Appl. No. 09/515,575, Non Final Office Action mailed Sep. 14, 2005", 17 pgs.
"U.S. Appl. No. 09/515,575, Non Final Office Action mailed Dec. 19, 2002", 19 pgs.
"U.S. Appl. No. 09/515,575, Notice of Allowance mailed Mar. 8, 2007", 10 pgs.
"U.S. Appl. No. 09/515,575, Notice of Allowance mailed Apr. 23, 2008", 6 pgs.
"U.S. Appl. No. 09/515,575, Notice of Allowance mailed Aug. 6, 2008", 10 pgs.
"U.S. Appl. No. 09/515,575, Response filed Jan. 17, 2006 to Non Final Office Action mailed Sep. 14, 2005", 11 pgs.
"U.S. Appl. No. 09/515,575, Response filed Feb. 27, 2004 to Final Office Action mailed Dec. 17, 2003", 12 pgs.
"U.S. Appl. No. 09/515,575, Response filed Apr. 21, 2003 to Non Final Office Action mailed Dec. 19, 2002", 10 pgs.
"U.S. Appl. No. 09/515,575, Response filed Jun. 21, 2006 to Non Final Office Action mailed Mar. 21, 2006", 6 pgs.
"U.S. Appl. No. 09/515,575, Response filed Sep. 16, 2002 to Final Office Action mailed May 22, 2002", 15 pgs.
"U.S. Appl. No. 09/515,575, Response filed Oct. 13, 2004 to Non Final Office Action mailed Jul. 13, 2004", 14 pgs.
"U.S. Appl. No. 09/515,575, Response filed Oct. 18, 2001 to Non Final Office Action mailed Jul. 18, 2001", 23 pgs.

(56) References Cited

OTHER PUBLICATIONS

"U.S. Appl. No. 09/515,575, Response filed Nov. 7, 2006 to Final Office Action mailed Sep. 22, 2006", 13 pgs.
"U.S. Appl. No. 09/740,502, Notice of Non-Responsive Amendment mailed Dec. 7, 2012", 6 pgs.
"U.S. Appl. No. 09/740,502, Advisory Action mailed Apr. 24, 2006", 4 pgs.
"U.S. Appl. No. 09/740,502, Advisory Action mailed Jul. 19, 2007", 4 pgs.
"U.S. Appl. No. 09/740,502, Examiner Interview Summary mailed Mar. 17, 2008", 2 pgs.
"U.S. Appl. No. 09/740,502, Final Office Action mailed Jan. 4, 2010", 16 pgs.
"U.S. Appl. No. 09/740,502, Final Office Action mailed Jan. 14, 2009", 14 pgs.
"U.S. Appl. No. 09/740,502, Final Office Action mailed Jan. 27, 2006", 23 pgs.
"U.S. Appl. No. 09/740,502, Final Office Action mailed Mar. 2, 2005", 23 pgs.
"U.S. Appl. No. 09/740,502, Final Office Action mailed Apr. 19, 2007", 12 pgs.
"U.S. Appl. No. 09/740,502, Non Final Office Action mailed Aug. 8, 2005", 23 pgs.
"U.S. Appl. No. 09/740,502, Non Final Office Action mailed Sep. 16, 2004", 21 pgs.
"U.S. Appl. No. 09/740,502, Non Final Office Action mailed Oct. 19, 2006", 12 pgs.
"U.S. Appl. No. 09/740,502, Non-Final Office Action mailed Jan. 4, 2008", 12 pgs.
"U.S. Appl. No. 09/740,502, Non-Final Office Action mailed Jun. 10, 2009", 15 pgs.
"U.S. Appl. No. 09/740,502, Non-Final Office Action mailed Jul. 31, 2008", 13 pgs.
"U.S. Appl. No. 09/740,502, Preliminary Amendment filed Apr. 28, 2003", 14 pgs.
"U.S. Appl. No. 09/740,502, Preliminary Amendment filed Dec. 2, 2003", 20 pgs.
"U.S. Appl. No. 09/740,502, Response filed Jan. 23, 2007 to Non-Final Office Action mailed Oct. 19, 2006", 11 pgs.
"U.S. Appl. No. 09/740,502, Response filed Mar. 4, 2010 to Final Office Action mailed Jan. 4, 2010", 13 pgs.
"U.S. Appl. No. 09/740,502, Response filed Mar. 16, 2009 to Final Office Action mailed Jan. 14, 2009", 12 pgs.
"U.S. Appl. No. 09/740,502, Response filed Mar. 24, 2008 to Non-Final Office Action mailed Jan. 4, 2008", 9 pgs.
"U.S. Appl. No. 09/740,502, Response filed Mar. 27, 2006 to Final Office Action mailed Jan. 27, 2006", 24 pgs.
"U.S. Appl. No. 09/740,502, Response filed May 2, 2005 to Final Office Action mailed Mar. 2, 2005", 22 pgs.
"U.S. Appl. No. 09/740,502, Response filed Jul. 5, 2007 to Final Office Action mailed Apr. 19, 2007", 5 pgs.
"U.S. Appl. No. 09/740,502, Response filed Sep. 10, 2009 to Non Final Office Action mailed Jun. 10, 2009", 13 pgs.
"U.S. Appl. No. 09/740,502, Response filed Oct. 22, 2007 to Final Office Action mailed Apr. 19, 2007", 10 pgs.
"U.S. Appl. No. 09/740,502, Response filed Oct. 30, 2008 to Non-Final Office Action mailed Jul. 31, 2008", 17 pgs.
"U.S. Appl. No. 09/740,502, Response filed Nov. 8, 2005 to Non Final Office Action mailed Aug. 8, 2005", 27 pgs.
"U.S. Appl. No. 09/740,502, Response filed Dec. 16, 2004 Non-Final Office Action mailed Sep. 16, 2004", 25 pgs.
"U.S. Appl. No. 10/746,583, Final Office Action mailed Apr. 28, 2010", 14 pgs.
"U.S. Appl. No. 10/746,583, Non Final Office Action mailed Jan. 24, 2013", 15 pgs.
"U.S. Appl. No. 10/746,583, Non Final Office Action mailed Jul. 27, 2012", 15 pgs.
"U.S. Appl. No. 10/746,583, Non-Final Office Action mailed Jun. 3, 2008", 12 pgs.

"U.S. Appl. No. 10/746,583, Non-Final Office Action mailed Jun. 3, 2008", 6 pgs.
"U.S. Appl. No. 10/746,583, Non-Final Office Action mailed Oct. 15, 2009", 13 pgs.
"U.S. Appl. No. 10/746,583, Non-Final Office Action mailed Dec. 10, 2008", 12 pgs.
"U.S. Appl. No. 10/746,583, Response filed Jan. 15, 2010 to Non Final Office Action mailed Oct. 15, 2009", 13 pgs.
"U.S. Appl. No. 10/746,583, Response filed Mar. 10, 2009 to Non-Final Office Action mailed Dec. 10, 2008", 16 pgs.
"U.S. Appl. No. 10/746,583, Response filed Jul. 17, 2009 to Restriction Requirement mailed Jun. 17, 2009", 8 pgs.
"U.S. Appl. No. 10/746,583, Response filed Jul. 28, 2010 to Final Office Action mailed Apr. 28, 2010", 10 pgs.
"U.S. Appl. No. 10/746,583, Response filed Sep. 3, 2008 to Non-Final Office Action mailed Jun. 3, 2008", 17 pgs.
"U.S. Appl. No. 10/746,583, Response filed Oct. 29, 2012 to Non Final Office Action mailed Jul. 27, 2012", 12 pgs.
"U.S. Appl. No. 10/746,583, Restriction Requirement mailed Jun. 17, 2009", 6 pgs.
"U.S. Appl. No. 11/758,196, Notice of Allowance mailed Mar. 20, 2008", 8 pgs.
"U.S. Appl. No. 11/758,196, Notice of Allowance mailed Apr. 23, 2009", 6 pgs.
"U.S. Appl. No. 11/758,196, Notice of Allowance mailed Aug. 1, 2008", 6 pgs.
"U.S. Appl. No. 11/758,196, Preliminary Amendment filed Oct. 4, 2007", 6 pgs.
"U.S. Appl. No. 11/758,196, Supplemental Preliminary Amendment filed Nov. 16, 2007", 7 pgs.
"U.S. Appl. No. 12/202,145, Applicant's Summary of Examiner Interview filed Jan. 3, 2011", 1 pg.
"U.S. Appl. No. 12/202,145, Non-Final Office Action mailed May 14, 2010", 12 pgs.
"U.S. Appl. No. 12/202,145, Notice of Allowance mailed Dec. 3, 2010", 10 pgs.
"U.S. Appl. No. 12/202,145, Response filed Sep. 3, 2010 to Non Final Office Action mailed May 14, 2010", 21 pgs.
"U.S. Appl. No. 13/651,661, Non Final Office Action mailed Dec. 19, 2012", 29 pgs.
"Beyond.com Adds Customer Ratings to Web Site; First Internet Store to Post Comprehensive Online Buyers' Guide to Software", Business Wire; New York, (Nov. 16, 1998), 2 pages.
"BuyClearance.com—The Internet Clearance Superstore: Product Information", [Online]. Retrieved from the Internet: <URL: http://web.archive.org/web/20000124120021/www.buy.com/clearance/product.asp?sku=70000254>, (Accessed Aug. 29, 2003), 1 pg.
"Celebrating Its Third Year Anniversary eBay Sets Standard for Online Person-To-Person Trading", PR Newswire, New York, (FeedbackForum) downloaded from ProQuest Direct on the Internet on May 9, 2010, (Sep. 15, 1998.), p. 1.
"Chinese Application Serial No. 01822389.3, Office Action mailed Mar. 9, 2007", 9 pgs.
"Chinese Application Serial No. 01822389.3, Response filed Jul. 24, 2007 to Office Action mailed Mar. 9, 2007", 19 pgs.
"Development of a Supporting System for Group Use of Personal Connections Using Collaborative Agents", Technical Report of IEICE, (1996), 31-36.
"Ebay—What is Mutual Feedback Withdrawal?", [Online]. Retrieved from the Internet: <URL:http://pages.ebay.com/help/feedback/questions/mutual-withdrawal.html>, (Accessed Apr. 3, 2006), 6 pgs.
"Ebay Community chat", ebay.com webpage from web.archive.org, (Dec. 12, 2000), 1-2.
"eBay Feedback Removal Policy", eBay, [Online] Retrieved from the Internet: <URL: http://pages.ebay.com/help/community/fbremove.html>, (Archived Jun. 19, 2000), 3 pgs.
"eBay Help: Basics : FAQ : Feedback", ebay.com webpage from web.archive.org, (Oct. 12, 1999), 1-3.
"eBay Help: community Standards: eBay Help: Rules and safety", ebay.com webpage from web.archive.org, (Aug. 1, 2000), 1-2.
"eBay Leave Feedback about an eBay User", ebay.com webpage from web.archive.org, (Aug. 25, 1999), 1-2.

(56) References Cited

OTHER PUBLICATIONS

"ebay Listings : Cufflinks, Studs", ebay.com webpage from web.archive.org, (Feb. 8, 2001), 1-3.
"ebay: The ebay Q&A Board", ebay.com webpage from web.archive.org, (Oct. 3, 2000), 1-21.
"EP Application Serial No. 01274337.3, Written Submission filed Oct. 4, 2012 to EP Summons to Attend Oral Proceedings mailed Jul. 23, 2012", 16 pgs.
"Epinions.com", [Online]. Retrieved from the Internet: <http://web.archive.org/web/19991129024603/www.epinions.com/>, (1999), 35 pgs.
"European Application Serial No. 01274337.3, European Search Report mailed Nov. 15, 2005", 2 pgs.
"European Application Serial No. 01274337.3, Office Action Mailed Feb. 13, 2009", 4 pgs.
"European Application Serial No. 01274337.3, Response filed Aug. 24, 2009 to Office Action mailed Feb. 13, 2009", 37 pgs.
"European Application Serial No. 01274337.3, Summons to Attend Oral Proceedings mailed Jul. 23, 2012", 8 pgs.
"European Application Serial No. 01913244.8, Office Action mailed Sep. 16, 2005", 1 pg.
"European Application Serial No. 01913244.8, Office Action mailed Nov. 18, 2005", 6 pgs.
"European Application Serial No. 01913244.8, Response filed Apr. 28, 2006 to Office Action mailed Nov. 18, 2005", 10 pgs.
"European Application Serial No. 01913244.8, Search Report mailed Sep. 14, 2005", 2 pgs.
"European Application Serial No. 01913244.8, Summons to Attend Oral Proceedings mailed Nov. 15, 2010", 11 pgs.
"Feedback Overview and Feedback Forum", [Online]. Retrieved from the Internet: <URL: www.ebay.com>, (1999), 4 pages.
"Frequently Asked Questions about Feedback Forum", via the Wayback Machine, [Online]. Retrieved from the Internet: <URL: www.archive.org/web/19991122031437/http://pages.ebay.com/help/basics/f-feedback.html#3>, (Nov. 10, 1999), 3 pgs.
"Give some feedback on an AuctionWeb user", [Online]. Retrieved from the Internet: <URL: http://web.archive.org/web/19981203032739/www2ebay.com/aw/user-feedback.html>, (May 18, 2005), 2 pgs.
"Home builder has customer satisfaction as its cornerstone", Daily Herald; Arlington Heights, Chrystal Caruthers Daily Herald Business Writer., Copyright Paddock Publication, (Nov. 25, 1998), 2 pages.
"International Application Serial No. PCT/US00/17136 International Search Report mailed Nov. 16, 2000", 6 pgs.
"International Application Serial No. PCT/US01/06709, International Preliminary Examination Report mailed Mar. 25, 2002", 14 pgs.
"International Application Serial No. PCT/US01/06709, International Search Report mailed Sep. 10, 2001", 2 pgs.
"International Application Serial No. PCT/US01/12398 International Search Report mailed Aug. 27, 2001", 3 pgs.
"International Application Serial No. PCT/US01/50499, International Preliminary Examination Report mailed Dec. 3, 2004", 4 pgs.
"Leave Feedback about a eBay User", Retrieved on Jan. 20, 2006 from wayback machine, [Online]. Retrieved from the Internet: <URL: http://web.archive.org/web/19990825071501/cgi2.ebay.com/aw-cgi/eBayISAPI.dll>, (Nov. 10, 1999), 5 pgs.
"Leaving Feedback", Wayback Machine Internet archive, [Online]. Retrieved from the Internet: <URL: http://pages.ebay.com/help/feedback/questions/leaving-feedback.html>, (Nov. 10, 1999), 3 pages.
"Meg Muscles eBay Uptown, Fortune", Special Report, downloaded from ProQuest Direct on the Internet on May 9, 2010, 7 pages, (Jul. 5, 1999), 81-88.
"MTB Review", [Online]. Archived [Jan. 25, 1997] Retrieved from the Internet: <URL: http://web.archive.org/web/19970125123339/http://www.mtbr.com/>, (Accessed Jan. 27, 2005), 9 pgs.

"Onsale Joins Fray as Online Shopping Picks Up Speed: Internet Booms", Computer Reseller News, CMP Publications, Inc., USA, (Jun. 5, 1995), 1 pg.
"Onsale: Onsale Brings Thrill of Auctions and Bargain Hunting Online; Unique Internet retail service debuts with week-long charity auction for The Computer Museum in Boston", Business Wire, Dialog Web. 0489267 BW0022, (May 24, 1995), 3 pgs.
"PlanetAll Plans to Make a World of Difference in Busy Lives", PR Newswire, Financial News, (Nov. 13, 1996), 1-3.
"See the Feedback Profile of an eBay User", ebay.com webpage from web.archive.org, (Dec. 5, 2000), 1.
"Sixdegrees.com", web.archive.org, (Jan. 19, 2000), 1-15.
"Social Network", Wikipedia, [Online]. Retrieved from the Internet: <URL: http://en.wikipedia.org/wiki/Soical_networking>, (Archived Apr. 1, 2004), 1-7.
"The Feedback Forum", ebay.com webpage from web.archive.org, (Dec. 17, 2000), 1-2.
"The Feedback Forum: FAQ", eBay, [Online]. Retrieved from the Internet: <URL: http://web.archive.org/web/19991012230420/pages.ebay.com/help/basics/f-feedback.html>, (Archived Oct. 12, 1999), 4 pgs.
Aho, A. V., "Directed Graphs", Date Structures And Algorithms, Addison-Wesley Publishing Company, Menlo Park, California, (1983), 198-219.
Aho, Alfred V., "Data Structures and Algorithms: Chapter 3 Trees", Addison-Wesley Publishing Company, Menlo Park, California, (1983), 75-89.
Alexander, Steve, "Digital auction: Concept is attracting traditional, new media Star Tribune (Minneapolis, MN)", (Mar. 1, 1998), 1-6.
Annen, Kurt, "Social Capital, Inclusive Networks, and Economic Performance", Journal of Economic Behavior & Organization, vol. 50, Issue 4, (2003), 1-27.
audioreview.com, "NAD 412 Reviews, Found on WayBackMachine", Online Reviews, [Online]. Retrieved from the Internet: <URL: http://web.archive.org/web/19990203004345/www.audioreview.com/reviews/Turner/nad_412_turner.shtml>, (Feb. 3, 1995), 9 pgs.
Barrett, Alexandra, "What's Your Epinion? on Epinion.com, read product reviews by regular folks, then post your own", Network World, (Sep. 13, 1999), 2 pgs.
Beyond.com, "IMS Web Spinner Personal V1.26 for Win95/98/NT", [Online]. Retrieved from the Internet: <URL: http://web.archive.org/web/20000125152017/www.beyond.com/PKSN104373/prod.htmcrewiew >, (1998-2000), 3 pages.
Business Wire, "Mediappraise Receives National Award for Web-based Technology That Enables Companies to Solve Thorny HR Problem", Business Wire, (Dec. 14, 1998), 1-2.
Cann, A. J., "Innovations in Education and Training International", Journal Paper, Vo. 36, Routledge, United Kingdom, (Feb. 1999), 44-52.
Chicago Tribune, "Amazon.com expands into toys, electronics", Chicago Tribune, (Jul. 14, 1999), 3;1.
Consumer Review!, "49,000 Product Reviews by Consumers for Consumers", [Online]. Retrieved from the Internet: <URL: http://web.archive.org/web/19981206010249/http://www.consumer-review.com>, (1996-1998), 22 pgs.
Dellarocas, C., "Immunizing online reputation reporting systems against unfair ratings and discriminatory behaviour", Proceedings of the 2nd ACM conference on Electronic commerce, (2000), 150-157.
Dellarocas, C., "The Digitization of Word-of-Mouth: Promise and challenges of Online Reputation Mechanisms", Sloan School of Management, MIT, (Oct. 1, 2003), 1-38.
Ekstrom, Martin, "A rating system for AEC e-bidding", (Nov. 27, 2000), 1-17.
Festa, Paul, "Have an Epinion?", CNET News.com, Online Article, http://news.com.com/2100-1023-228193.html, (Jul. 9, 1999), 2 pages.
Foner, Leonard Newton, "Political Artifacts and Personal Privacy: The Yenta Multi-Agent Distributed Matchmaking System", (1999), 8 pgs.
Foner, Leonard N, "Yenta: A Multi-Agent, Referral-Based Matchmaking System", MIT Media Lab/AMC, retrieved from Google Scholar, (1997), 301-307.

(56) References Cited

OTHER PUBLICATIONS

Graham, Ian, "The Emergence of Linked Fish Markets in Europe", Electronic Markets. vol. 8, No. 2, (1998), 29-32.
Guglielmo, Connie, "BizRate Lets Consumers Rate Sites", Interactive Week, 4(22), (Aug. 4, 1997), 4 pgs.
Hanneman, Robert A, "Introduction to Social Network Methods", On-line textbook, Riverside, CA: University of California, Riverside, (2001), 1-150.
Harris, Donna, "Product Helps Dealer Reward Loyal Customers", Automotive News, vol. 73, Issue 5801, (Jan. 11, 1999), p. 38, 1/9 p.
Hess, C. M, et al., "Computerized Loan Organization System: An Industry Case Study of the Electronic Markets Hypothesis", MIS Quarterly, vol. 18(3), (Sep. 1994), 251-275.
Jordan, Ken, "The Augmented Social Network: Building identity and trust into the next-generation Internet", first monday, peer-previewed journal on the internet,, [Online]. Retrieved from the internet: <URL: http://www.firstmonday.dk/issues/issue8_8/jordan/>, (Archived Aug. 2, 2003), 1-66.
Kautz, et al., "Agent Amplified Communication", Proceedings of the 13th National Conf on Artificial Intelligence and the 8th Innovative Applications of Artificial Intelligence Conference, vol. 1, (1996), 3-9.
Kautz, et al., "The Hidden Web", American Association for Artificial Intelligence, (1997), 27-36.
Kautz, et al., "Welcome to . . . ReferralWeb", (Apr. 1999), 1-44.
Kautz, Henry, et al., "Referral Web: Combining Social Networks and Collaborative Filtering", in Communications of the ACM, 40(3), (Mar. 1997), 63-65.
Klein, Stefan, "Introduction to Electronic Auctions", Focus Theme, vol. 7, No. 4, (1997), 3-6.
Kornblum, Janet, "Consumer Reports an online win", CNET News.com, Online Article, http://news.com.com/2100-1023-217386.html, (Nov. 2, 1998), 2 pgs.
Krigel, Beth Lipton, "Big changes ahead for Deja News", CNET News.com, Online Article, http://news.com.com/2100-1023-225101.html, (Apr. 28, 1999), 3 pages.
Langley, Paul A., "Building cognitive feedback into a microworld learning environment: Results from a pilot", System dynamics,—systemdynamics.org, (1995), 1 pg.
Lee, Ho Geun, "AUCNET: Electronic Intermediary for Used-Car Transactions", Focus Theme, Electronic Markets, vol. 7, No. 4, (1997), 24-28.
Malaga, R. A, "Web-Based Reputaton Management Systems: Problems and Suggested Solutions", vol. 1, (2001), 403-417.
Mardesich, Jodi, "Site Offers Clearance for End-of-Life Products—Onsale Takes Auction Gavel Electronic", Computer Reseller News, (Jul. 8, 1996), 2 pps.
Massimb, Marcel, "Electronic Trading, Market Structure and Liquidity", Financial Analysts Journal, 50(1), (Jan./Feb., 1994), 39-50.
Meade, J., "Visual 360: A Performance Appraisal System That's 'Fun'", HR Magazine, Society for Human Resource Management., (Jul. 1999), 3 pgs.
Miller, Michael J., "The Best Products of 1999 Revealed", ZDNet, http://www.zdnet.com/anchordesk/stories/story/0,10738,5019537,00.html, (Dec. 13, 1999), 2 pgs.
Mui, Lik, "A Computational Model of Trust and Reputation", Proceedings of the 35th Hawaii International Conference on System Sciences—2002, (2002), 9 Pages.
Nielsen, Jakob, "Reputation Managers are Happening", useit.com, Alertbox, (Sep. 5, 1999), 4 pages.
Patience, Nick, "Epinons Launches Online Shopping Guide Built on Trust", Computergram International, 3744, The Gale Group Newsletter, (Sep. 10, 1999), 2 pgs.
Post, D. L, et al., "Application of auctions as a pricing mechanism for the interchange of electric power", IEEE Transactions on Power Systems, 10(3), (Aug. 1995), 1580-1584.
Preist, Chris, et al., "Adaptive Agents in a Persistent Shout Double Auction", International Conference on Information and Computation Economies, Proceedings of the first international conference on Information and computation economies, (1998), 11-18.
Pricescan.com, "PriceSCAN: Your Unbiased Guide to the Lowest Prices on Books, Computers, Electronic . . . ", [Online]. Retrieved from the Internet: <URL: http://web.archive.org/web/19991117123352//www.pricescan.com>, (1997-1999), 1 page.
Product ReviewNet!, "Welcome to Product ReviewNet! The Premier Online Source for Product Review Abstracts", [Online]. Archived [Dec. 1, 1998]. Retrieved from the Internet: <URL: http://web.archive.org/web/19981201205356/www.productreviewnet.com/splash.html>, (1998), 1 pg.
Product ReviewNet!, "Welcome to Product ReviewNet! Your Source for Product Review Information", [Online]. Archived [Nov. 14, 1999]. Retrieved from the Internet: <URL: http://web.archive.org/web/19991114054251/www.productreviewnet.com/splash.html>, (1999), 1 page.
Pujol, Josep M, "Extraxting Reputation in Multi Agent Systems by Means of Social Network Topology", Proceedings of the first international joint conference on Autonomous agents and multiagent systems, (2002), 8 Pages.
Rasmusson, Lars, "Simulated Social Control for Secure Internet Commerce", Proceedings of the 1996 Workshop on New Security Paradigms, Lake Arrowhead, California, United States, (Apr. 1, 1996), 18-25.
Reck, Martin, "Trading-Process Characteristics of Electronic Auctions", Focus Theme, vol. 7, No. 4, (1997), 17-23.
Resnick, P., et al., "Trust among Strangers in Internet Transactions: Empirical Analyses of eBay's Reputation System", NBER Workshop, (Feb. 5, 2001), 1-26.
Resnick, Paul, "Reputation systems", Communications of the ACM, 43(12), (Dec. 2000), 45-48.
Rockoff, T. E, et al., "Design of an Internet-based system for remote Dutch auctions", Internet Research: Electronic Networking Applications and Policy, vol. 5(4), (Jan. 1, 1995), 10-16.
Sabater, Jordi, "Regret: A reputation model for gregarious societies", IIIA—Artificial Intelligence Research Intitute, CSIC, [Online]. Retrieved from the Internet: <URL: http://citeseerx.ist.psu.edu/viewdoc/download?doi=10.1.1.88.797&rep=rep1&type=pdf>, (1999), 9 pgs.
Sabater, Jordi, et al., "Reputation and Social Network Analysis in Multi-Agent Systems", Proceedings of the first international joint conference on Autonomous agents and multiagent systems: part 1 table of contents. Session: Session 2D: group and organizational dynamics, (2002), 475-482.
Schmid, B. F, "The Development of Electronic Commerce", EM—Electronic Markets, No. 9-10, (Oct. 1993), 2 pgs.
Shah, M.A., "Referral Web: A Resource location system guided by personal relations", Master's thesis, M.I.T., (May 1997), 1-47.
Siegmann, Ken, "Nowhere to go but up", PC Week; vol. 12(42), Ziff-Davis Publishing Company, (Oct. 23, 1995), 1-3.
Slavin, Robert E, et al., "Improving Intergroup Relations: Lessons Learned from Cooperative Learning Programs", (1999), 1-25.
Svensson, Lars, "Discursive evaluation in a distributed learning community", Australian Journal of Educational Technology—Citeseer, (2002), 11 pgs.
Tjostheim, Ingvar, et al., "A case study of an on-line auction for the World Wide Web", Norwegian Computing Center (NR), [Online]. Retrieved from the Internet: <URL: http://www.nr.no/~ingvar/enter98.html>, (Accessed Feb. 21, 2005), 1-10.
Turban, Efraim, "Auctions and Bidding on the Internet: An Assessment", Focus Theme, EM—Electronic Markets, vol. 7, No. 4, (1997), 7-11.
Van Heck, E., et al., "Experiences with Electronic Auctions in the Dutch Flower Industry", Focus Theme, Erasmus University, The Netherlands, (1996), 6 pgs.
Vendelo, Morten Thanning, "Narrating Corporate Reputation: Becoming Legitimate Through Storytelling", International Studies of Management & Organization v28n3, (Fall 1998), 120-137.
Vivian, Nathan, "Social Networks in Transnational and Virtual Communities", Informing Science, InSITE—"Where Parallels Intersect", (Jun. 2003), 1431-1437.
Wellman, Barry, "An Electronic Group is Virtually a Social Network", almost final version of Chapter 9 in Sara Kiesler, ed., Culture of the Internet, Hillsdale, NJ: Lawrence Erlbaum, (1997), 26 Pages.

(56) References Cited

OTHER PUBLICATIONS

Wolverton, Troy, "Productopia launches product review site", CNET News.com, http://news.com.com/2100-1017-228811.html, (Jul. 21, 1999), 2 pages.
Yu, Bin, et al., "A Social Mechanism of Reputation Management in Electronic Communities", Proceedings of the 4th International Workshop on Cooperative Information Agents IV, The Future of Information Agents in Cyberspace, (2000), 154-165.
Zacharia, Giorgis, et al., "Collaborative Reputation Mechanism in Electronic Marketplaces", IEEE, (1999), 1-7.
Zacharia, Giorgos, et al., "Collaborative Reputation Mechanisms in Electronic Marketplaces", Proceedings of the 32nd Hawaii International Conference on System Sciences, (1999), 1-7.
Zachiara, et al., "Collaborative reputation mechanisms for electronic marketplaces", Decision support systems, vol. 29, (Dec. 2000), 371-388.
Zwass, V., "Electronic Commerce: Structures and Issues", International Journal of Electronic Commerce, Fall 1996, vol. 1, No. 1, (Fall 1996), 3-23.
"Application U.S. Appl. No. 09/740,502, Notice of Non-Responsive Amendment mailed Dec. 7, 2012", 6 pgs.
"U.S. Appl. No. 10/746,583, Final Office Action mailed Jun. 13, 2014", 20 pgs.
"U.S. Appl. No. 10/746,583, Final Office Action mailed Jul. 29, 2013", 18 pgs.
"U.S. Appl. No. 10/746,583, Non Final Office Action mailed Dec. 4, 2013", 18 pgs.
"U.S. Appl. No. 10/746,583, Response filed Mar. 4, 2014 to Non Final Office Action mailed Dec. 4, 2013", 11 pgs.
"U.S. Appl. No. 10/746,583, Response filed Apr. 24, 2013 to Non Final Office Action mailed Jan. 24, 2013", 9 pgs.
"U.S. Appl. No. 10/746,583, Response filed Sep. 15, 2014 to Final Office Action mailed Jun. 13, 2014", 12 pgs.
"U.S. Appl. No. 10/746,583, Response filed Oct. 29, 2013 to Final Office Action mailed Jul. 29, 2013", 11 pgs.
"U.S. Appl. No. 12/202,145, 312 Amendment filed Nov. 14, 2013", 7 pgs.
"U.S. Appl. No. 12/202,145, Notice of Allowance mailed Aug. 14, 2013", 9 pgs.
"U.S. Appl. No. 12/202,145, PTO Response to 312 Amendment mailed Nov. 22, 2013", 2 pgs.
"U.S. Appl. No. 13/651,661, Advisory Action mailed Aug. 9, 2013", 2 pgs.
"U.S. Appl. No. 13/651,661, Final Office Action mailed Apr. 25, 2013", 24 pgs.
"U.S. Appl. No. 13/651,661, Notice of Allowance mailed Sep. 12, 2013", 28 pgs.
"U.S. Appl. No. 13/651,661, Response filed Mar. 19, 2013 to Non Final Office Action mailed Dec. 19, 2012", 10 pgs.
"U.S. Appl. No. 13/651,661, Response filed Jul. 26, 2013 to Final Office Action mailed Apr. 25, 2013", 11 pgs.
"U.S. Appl. No. 13/651,661, Response filed Aug. 26, 2013 to Advisory Action mailed Apr. 25, 2013", 11 pgs.
"U.S. Appl. No. 14/086,805, Preliminary Amendment filed Mar. 7, 2014", 7 pgs.
"U.S. Appl. No. 14/159,272, Preliminary Amendment filed Apr. 11, 2014", 7 pgs.
"U.S. Appl. No. 14/282,812, Preliminary Amendment filed Jun. 2, 2014", 7 pgs.
"U.S. Appl. No. 14/283,009, Preliminary Amendment filed Jun. 2, 2014", 7 pgs.
"U.S. Appl. No. 14/283,029, Preliminary Amendment filed Jun.2, 2014", 7 pgs.
"U.S. Appl. No. 14/283,059, Preliminary Amendment filed Jun. 2, 2014", 7 pgs.
"U.S. Appl. No. 14/283,081, Preliminary Amendment filed Jun. 2, 2014", 7 pgs.
"Application Serial No. 148282,962, Preliminary Amendment filed Jun. 2, 2014", 7 pgs.
"European Application Serial No. 01274337.3, Decision to Refuse mailed Apr. 8, 2013", 12 pgs.
"International Application Serial No. PCT/US01/50499, International Search Report mailed Apr. 23, 2004", 2 pgs.
"International Application Serial No. PCT/US01/50499, Written Opinion mailed Nov. 3, 2004", 5 pgs.
Ba, Sulin, et al., "Evidence of the effect of trust building technology in electronic markets: Price premiums and buyer behavior", MIS quarterly, vol. 26, No. 3, (Sep. 2002), 246-268.
Guth, Werner, et al., "The Coevolution of Trust and Institutions in Anonymous and Nonanonymous Communities", Max Planck Institute for Research into Economic Systems, [Online]. Retrieved from the Internet: <URL: http://papers.econ.mpg.de/esi/discussionpapers/2002-07>, (Mar. 1, 2002), 21 pgs.
Ockenfels, Axel, "New Institutional Structures on the Internet: The Economic Design of Online Auctions", Max Planck Institute for Research into Economic Systems, [Online]. Retrieved from the Internet: <URL: papers.econ.mpg.de>, (Mar. 1, 2002), 25 pgs.
Tosi, Henry, "The effects of expectation levels and role consensus on the buyer-seller dyad", The Journal of Business, vol. 39, No. 4, (Oct. 1966), 516-529.

\* cited by examiner

Overall profile makeup 52 positives. 52 are from unique users and count toward the final rating.

0 neutrals. 0 are from users no longer registered.

0 negatives. 0 are from unique users and count toward the final rating.

eb Y ID card ▮▮▮@aol.com (52)

Member since Wednesday, Aug 25, 1999    ☆ me

Summary of Most Recent Comments

|  | Past 7 days | Past month | Past 6 mo. |
|---|---|---|---|
| Positive | 2 | 17 | 36 |
| Neutral | 0 | 0 | 0 |
| Negative | 0 | 0 | 0 |
| Total | 2 | 17 | 36 |
| Bid Retractions | 0 | 0 | 0 |

Auctions by ▮▮▮@aol.com

You can leave feedback for this user. Visit the Feedback Forum for more info on feedback profiles.

If you are ▮▮▮@aol.com (52) ☆ me , you can respond to comments in this Feedback Profile.

| Items 1-25 of 52 total |
|---|
| = 1 = [2] [3] (next page) |

| User: ▮▮▮@jps.net (33) ☆  Date: Jul-11-00 13:53:24 PDT         Item: 370125051 |
|---|
| Praise: High quality item , shipped promply, I recommend flyupdown highly AAA+++ |

| User: ▮▮▮@aol.com (19) ☆  Date: Jul-07-00 23:02:35 PDT         Item: 366157731 |
|---|
| Praise: Good communication, fast service, excellent product. Very satisfied!! |

| User: ▮▮▮@edge.net (8)  Date: Jul-04-00 19:39:16 PDT         Item: 358259551 |
|---|
| Praise: Fast shipment, Great doing business with! |

| User: ▮▮▮@aol.com (17) ☆  Date: Jun-30-00 10:40:48 PDT         Item: 318190404 |
|---|
| Praise: Great seller...Delivered as advertised.....A+++ |

Figure 1

Leave Feedback about an eBay User

| | |
|---|---|
| Your User ID: [_____] 205<br>Your Password: [_____] 210<br>             Forgot your password? | You are responsible for your own words. |
| | Your comments will be attributed with your name and the date. eBay cannot take responsibility for the comments you post here, and you should be careful about making comments that could be libelous or slanderous. To be safe, make only factual, emotionless comments. Contact your attorney if you have any doubts. You will not be able to retract or edit Feedback you left. eBay does not remove Feedback unless there is an exceptional circumstance. Think before you leave Feedback.<br><br>Please try to resolve any disputes with the other party before publicly declaring a complaint. |

[_____] 215
User ID of person who you are commenting on

[_____] 220
Item number (please include since all feedback must be transactional)

Is your comment positive, negative, or neutral?
⊂ positive   ⊂ negative   ⊂ neutral    225

[_____] 230
Your comment (max. 80 characters)

WARNING: Once placed, comments cannot be retracted. See the Feedback Forum for an explanation about how your comments affect a users's Feedback Rating.

Click once to [leave comment] 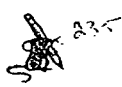 235

Or [clear form] to start again

Figure 2

CONGRATULATIONS YOU WON!

LEAVE FEEDBACK ABOUT    BOB 2000    710

YOUR USER ID    KURTL100    711
YOUR PASSWORD    XXXXXX    713

ITEM: 1795 FUSEE POCKET WATCH    720
TRANSACTION: 157264    721
SELLER ID: BOB2000    723

COMMENTS (PICK ONE)

| NA | ▼ | POSITIVE 730 |
| NA | ▼ | NEUTRAL 731 |
| NA | ▼ | NEGATIVE 732 |

SUBMIT RESPONSE    740

Fig. 7a

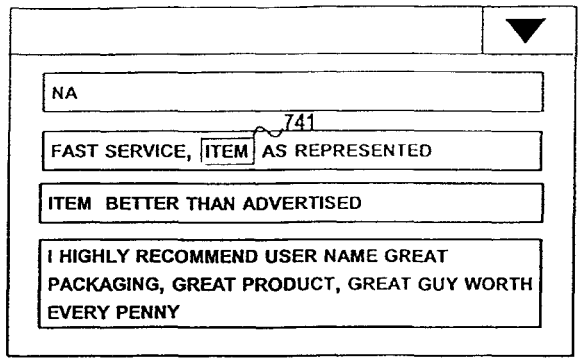
Positive Comments Drop Down Box 730
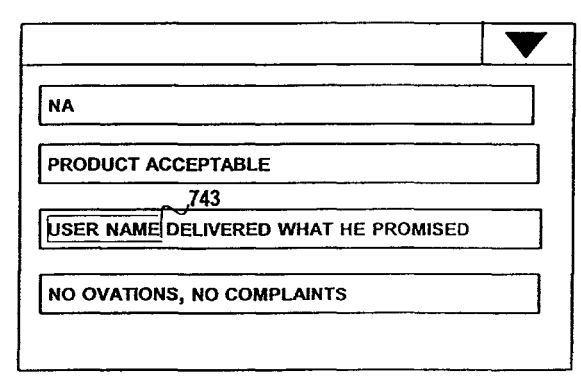
Neutral Comments Drop Down Box 731
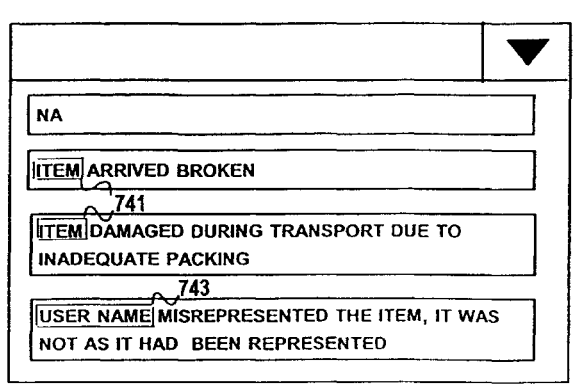
Negative Comments Drop Down Box 732
Fig. 7b

LEAVE FEEDBACK ABOUT     KurtL100   850

YOUR USER ID   BOB2000   851
YOUR PASSWORD   XXXXXX   853

ITEM: 1795 FUSEE POCKET WATCH   860
TRANSACTION: 157264   861
BAGER ID: KurtL100   863

COMMENTS (PICK ONE)

▼ POSITIVE 870
▼ NEUTRAL 871
▼ NEGATIVE 872

SUBMIT RESPONSE   880

Fig. 8a

| NA |
| SENT CHECK PROMPTLY, GREAT TRANSACTION |
| [KurtL100] CAN BUY FROM ME ANYTIME |
| GREAT GUY, GREAT EXPERIENCE, WOULD DO IT AGAIN |

POSITIVE COMMENTS DROP DOWN BOX

| NA |
| TRANSACTION WENT SMOOTHLY |
| PAYMENT RECEIVED WITHIN REASONABLE TIME |
| FAIR EXCHANGE |

NEUTRAL COMMENTS DROP DOWN BOX

| NA |
| [KurtL100] CANCELLED HIS CHECK |
| [KurtL100] NEVER RESPONDED TO MY EMAILS |
| I'M GOING TO SUE [KurtL100] |
| [KurtL100] NEVER PAID FOR [1795 FUSEE POCKET WATCH] |

NEGATIVE COMMENTS DROP DOWN BOX

Fig. 8b

RESPONSE COMMENT FORM 900

FEEDBACK HAS BEEN LEFT ABOUT YOU BY  KurtL100
CONCERNING TRANSACTION  157264

YOUR USER ID  BOB 2000
YOUR PASSWORD  XXXXXXX

ITEM: 1795 FUSEE POCKET WATCH
TRANSACTION: 157264
BAGER ID: KURT L100
KurtL100'S COMMENT  [ITEM] ARRIVED BROKEN, NOT PACKAGED PROPERLY  905
RESPONSE CHOICE  NO RESPONSE  910
SUBMIT RESPONSE NO RESPONSE
[ITEM] WAS PROPERLY PACKAGED
I WILL ACCEPT RETURN OF THE [ITEM] AND GIVE REFUND
CONTACT SHIPPING SERVICE TO MAKE INSURANCE CLAIM
[ITEM] WAS SOLD AS-IS

RESPONSE CHOICE COMENT BOX 910

Fig. 9

METHOD AND APPARATUS FOR PROVIDING PREDEFINED FEEDBACK

CROSS REFERENCE TO RELATED APPLICATION

This application is a Continuation of U.S. patent application Ser. No. 09/740,502, filed Dec. 19, 2000, which application is incorporated herein by reference in its entirety.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to the art of conducting e-Commerce transactions over a network. More particularly, the invention relates to a method of providing feedback between users of an e-commerce site utilizing predefined sets of comments.

2. Background of the Invention

The emergence of electronic commerce has revolutionized the manner in which goods and services may be bought and sold. In particular, the development of online auctions conducted over the Internet have enabled individuals to sell items with relatively little effort or expense while at the same time reaching a much larger potential pool of buyers than using more traditional means such as classified advertising and garage sales.

In a typical online auction, a seller submits an offer to sell an item, the item becomes available for bidding for a predetermined, period of time. Buyers are able to view a description and often an image of the item, and submit bids. The potential buyer who tenders the highest bid "wins" the auction provided his bid is in excess of any minimum price required by the seller, and a contractual obligation is created in which the buyer and seller are required to complete the transaction.

It is the completion of the transaction, i.e., the exchange of the seller's item for the buyer's payment that is the potentially most perilous part of the transaction. More often than not, a buyer and seller are located far apart from each other, often in separate states or countries (from herein state or states unless otherwise stated shall refer to both states of the United States, as well as other countries or nations). Accordingly, the promised item and payment must be shipped via the post or some other package delivery service. A seller may request payment prior to shipping the item or the seller may require cash on delivery (COD). In either case, the buyer will not have the opportunity to verify the item was as the seller represented it, until after payment. The item shipped may end up being broken or in worse condition than represented; or if the seller is particularly unscrupulous, a dummy item may be shipped in place of the promised item. On the reverse, where a buyer pays with a check, he may stop payment on the check shortly after receiving the item, defrauding the seller of his item. Given the geographic distance between the typical buyer and seller and the relatively small values of the items being bought and sold, it is seldom practical for the aggrieved buyer or seller to seek recourse in the courts.

In order to combat the problem of dishonest and/or unscrupulous users, online auction services such as eBay, Inc. of San Jose, Calif., have instituted mechanisms to combat fraudulent and dishonest practices among buyers and sellers. For instance, eBay requires each user to register with, the service before offering an item for auction or bidding on an item. In order to complete registration, the user must provide either a verifiable e-mail address (i.e., one that cannot be easily set up using a pseudonym) or a credit card number. If eBay determines that a registered user is utilizing improper buying or selling practices, it can ban the user from using the auction facility in the future.

Another practice used by some auction services is to provide the buyer and seller with a feedback forum in which either user can leave comments about the other that may be of use to other users in the future in deciding whether to bid or sell from a particular user. Comments are typically positive, but a few negative comments can act to indicate a user that is not completely honest and who should be dealt with cautiously.

A representative example of a list of comments made about a user is provided in prior art FIG. 1 (the e-mail addresses of the users have been masked). A score that is indicative of the user's trustworthiness with regard to online auction transactions is determined based upon the number of positive, neutral and negative comment the user has received. Comments about registered user may be entered into the system through a feedback forum or through a feedback prompt provided to the successful bidder and the auctioneer upon the conclusion of a particular auction transaction.

Prior art FIG. 2 provides an example of a feedback screen that may be displayed to a user who desires to leave a comment about another user. The commenting user enters his or her ID into box 205, and his password into box 210. The ID of the user being commented on (or targeted user) is entered into box 215 and the transaction to which the comment is related is entered into box 220. The commenting user chooses the appropriate radio button as shown at 225 to indicate whether the comment is positive, neutral or negative. A free-form text comment is left in box 230 that can be up to 80 characters long. Finally, the comment is sent to the auction service for posting by clicking the "leave comment" box 235.

Once a comment is posted about a targeted user, that user may leave a responding comment to which the commenting user may respond. Since both the buyer and the seller may leave a comment with regard to a transaction, and respond to each other's comments and subsequently respond to each other responses, a total of up to six comments may be left for any single transaction.

Each comment is typically associated with the user making the comment and the user for whom the comment is intended, as well as the transaction to which the comment relates. Each comment must be stored in the auction service's storage devices. It can be appreciated that where a large number of auctions are regularly being concluded, the amount of storage space required to store all feedback comments is very large. For example, if the maximum of six 80-character comments are left for each transaction, approximately 0.5 kilobytes of storage space is necessary to store the comments. If it is considered that a service like eBay concludes tens of millions of auctions each year and that comments about particular users are stored for years, the amount of storage space is significant.

A feedback system as described above also presents several other problems: (1) there is no efficient and convenient manner of translating comments into other languages, and (2) in certain jurisdictions, the auction sendee may face liability for publishing slanderous comments or comments with inappropriate content. In current-feedback systems, a commenting user may leave a comment in any language he desires. For instance, a German user may purchase an item from a U.S. user and at the conclusion of the transaction, leave a comment about the U.S. user in German. This comment will have little meaning to other U.S. users who view the comments about the U.S. user unless they read German. Essentially in this situation, the feedback system, at least partially, fails in its purpose of providing useful information to auction users about other users.

Given the sheer volume of comments left each day on a large system like eBay, it is impractical to screen every comment for slanderous or libelous language before posting the comment on the system for other users to read. Accordingly, users may leave inappropriate comments for other users, which may cause the auction service which published the comment to incur civil and/or criminal liability for the comment under the laws of certain states. For instance, the slander and libel laws of Great Britain are stricter than those in the United States, and in certain Muslim states, publishing comments containing language of an inappropriate nature may be viewed as illegal.

SUMMARY OF THE INVENTION

A method and apparatus utilized in operating a feedback forum wherein predefined feedback comments are provided to users of an e-commerce system are described. First, the feedback system receives a request from a first user to leave feedback concerning a second user. The feedback system generates a set of predefined feedback comments that are to be displayed to the first user, and each comment is associated with an identifier. Upon receipt of a response form the first user, the system identifies the selected predefined comment about the second user, and the system stores the indicator in a data structure that is associated with the second user.

Other features of the present invention will be apparent from the accompanying drawings and from the detailed description that follows.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which:

FIG. 1 is a prior art illustration of a web page listing of comments about a user of an Internet-based auction service.

FIG. 2 is a prior art illustration of an online feedback form that is utilized by one user to leave a comment about another user.

FIGS. 7A and 7B are illustrations of a feedback form that may be used by the winner of an Internet auction to leave feedback for the seller.

FIGS. 8A and 8B are illustrations of a feedback form that may be used by the seller to leave feedback for the winner of an Internet auction.

FIG. 9 is an illustration of a feedback form that may be used by a seller in an Internet auction to respond to a comment left about him by the winner of the auction.

DETAILED DESCRIPTION OF THE INVENTION

A method and apparatus are described to facilitate the operation of a feedback forum in an e-commerce environment wherein comments are selected by a user from a predefined set presented to the user, for example, as a menu. Compared with prior art feedback forums, embodiments of the invention facilitate the efficient use of storage space by storing the predefined comments a minimum number of times and providing indicators or pointers within the stored user's database records the comments made about the user. In another embodiment, the predefined comment may be translated into any number of different languages, and depending on an indication of a default or preferred language of a user viewing his comments or those of another user, the comments may be provided in the default or preferred language. Finally, since the comments are predefined, they can be written to avoid liability under the slander or other laws of various states.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various operations which will be described below. The operations of the present invention may be performed by hardware components or may be embodied in machine-executable instructions, which may be used to cause a general-purpose or special-purpose processor programmed with the instructions to perform the operations. Alternatively, the operations may be performed by a combination of hardware and software.

The present invention may be provided as a computer program product that may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Exemplary Computer System

Figure 3:
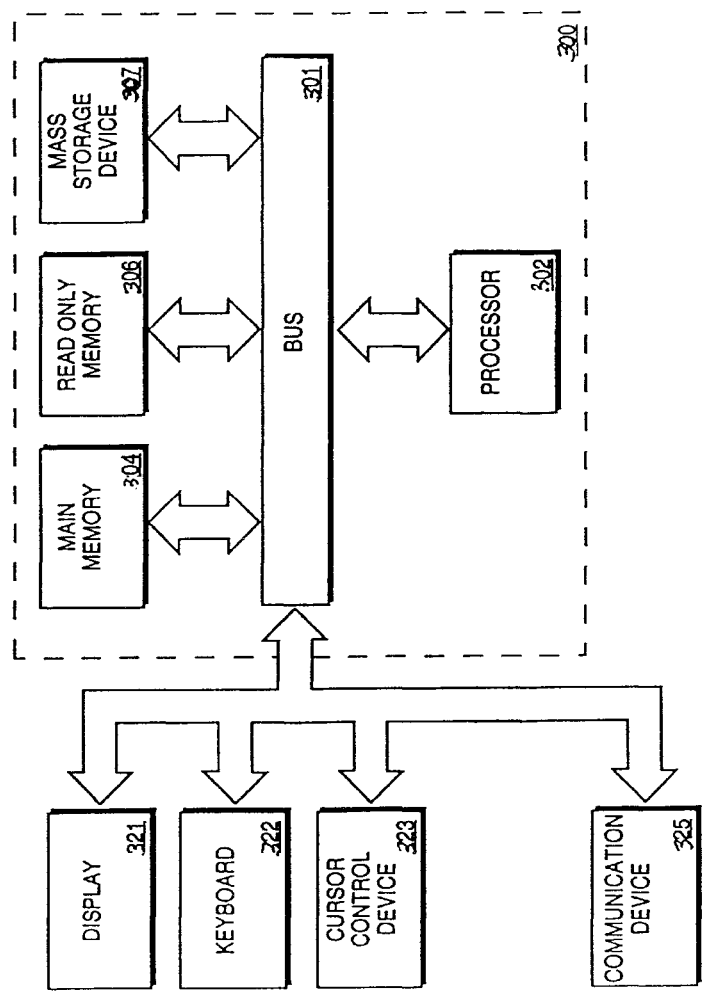
FIG. 3 is an illustration of an exemplary computer system on which three embodiments of the invention may be practiced.

FIG. 3 is an example of a typical computer system upon which embodiments of the present invention may be practiced. In the various embodiments, computer system 300 may be utilized as a server on which information including feedback comments about the various users of an e-commerce system is stored. Furthermore, computer system 300 may be used by a user to participate in an Internet auction including reading and leaving feedback comments.

Computer system 300 comprises a bus or other communication means 301 for communicating information, and a processing means such as processor 302 coupled with bus 301 for processing information. Computer system 300 further comprises a random access memory (RAM), flash memory, or other dynamic storage device 304 (referred to as main memory), coupled to bus 301 for storing information and instructions to be executed by processor 302. Main memory 304 also may be used for storing temporary variables or other intermediate information during execution of instructions by processor 302. Computer system 300 may also comprise a read-only memory (ROM) and/or other static storage device 306 coupled to bus 301 for storing static information and instructions for processor 302. A data storage device 307 such as a magnetic disk or optical disk and its corresponding drive may also be coupled to computer system 300 for storing information and instructions. In some architectures, a single memory device may perform the functions of two or more of the ROM 306, the main memory 304, and the mass storage device 307. In other architectures such as might be implemented with a server, the system 300 might have multiple mass storage devices 307.

Computer system 300 can also be coupled via bus 301 to a display device 321 such as a cathode ray tube (CRT) or Liquid Crystal Display (LCD), for displaying information to an end user. Typically, an alphanumeric input device 322, including alphanumeric and other keys, may be coupled to bus 301 for communicating information and/or command selections to processor 302. Another type of user input device that may be included in the computer system 300 is a cursor control 323, such as a mouse, a trackball, a pen in conjunction with a touch sensitive screen, or cursor direction keys for communicating direction information and command selections to processor 302 and for controlling cursor movement on display 321.

A communication device 325 may also be coupled to bus 301. The communication device 325 may include a modem, a network interface card or other well-known interface devices, such as those used for coupling to Ethernet, token ring, or other types of physical attachment for purposes of providing a communication link to support a local or wide-area network. In this manner, the computer system 300 may be coupled to a number of clients and/or servers via a conventional network infrastructure, such as the Internet.

It is appreciated that a lesser or more equipped computer system than the example described above may be desirable for certain implementations. Therefore, the configuration of computer system 300 will vary from implementation to implementation depending upon numerous factors, such as price constraints, performance requirements, technological improvements, and/or other circumstances.

It should be noted that while the operations described herein may be performed under the control of a programmed processor such as processor 302, in alternative embodiments, the operations may be fully or partially implemented by any programmable or hard-coded logic, such as Field Programmable Gate Arrays (FPGAs), TTL logic, or Application Specific Integrated Circuits (ASICs). Additionally, the method of the present invention may be performed by any combination of programmed general-purpose computer components and/or custom hardware components. Therefore, nothing disclosed herein should be construed as limiting the present invention to a particular embodiment wherein the recited steps are performed by a specific combination of hardware components.

Exemplary Internet Auction Facility

Figure 4:
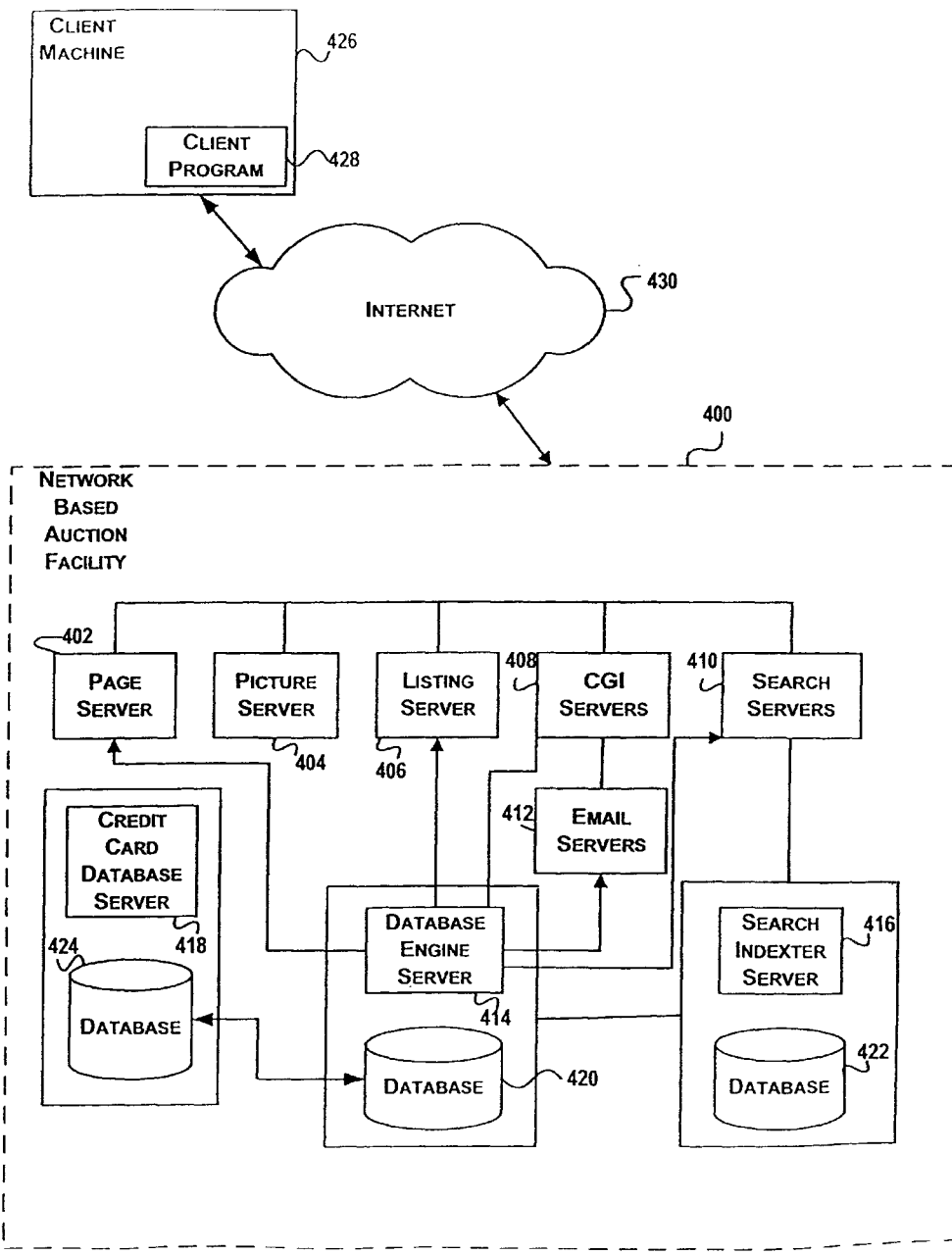
FIG. 4 is an illustration of an Internet Auction Facility through which embodiments of the invention may be practiced.

FIG. 4 is a block diagram illustrating an exemplary network-based transaction facility in the form of an Internet-based auction facility 400 on which embodiments of the invention may be practiced. While exemplary embodiments of the invention are described within the context of an auction facility, it will be appreciated by those skilled in the art that the invention will find application in many different types of e-commerce facilities.

The auction facility 400 includes one or more of a number of types of front-end servers, namely page servers 402 that deliver Web pages (e.g., markup language documents), picture servers 404 that dynamically deliver images to be displayed within Web pages, listing servers 406, CGI (Common Gateway Interface) or ISAPI servers 408 that provide an intelligent interface to the back-end of facility 400, and search servers 410 that handle search requests to the facility 400. E-mail servers 412 provide, inter alia, automated e-mail communications to users of the facility 400.

The back-end servers include a database engine server 414, a search index server 416, and a credit card database server 418, each of which maintains and facilitates access to a respective database 420, 422, 424.

The Internet-based auction facility 400 may be accessed by a client program 428 such as a browser (e.g., the Internet Explorer distributed by Microsoft Corp. of Redmond, Wash.) that executes on a client machine 426 and accesses the facility 400 via a network such as, for example, the Internet 430. Other examples of networks that a client may utilize to access the auction facility 400 include a wide area network (WAN), a local area network (LAN), a wireless network (e.g., a cellular network), or the Plain Old Telephone Service (POTS) network.

Exemplary Internet Auction Database

Figure 5:
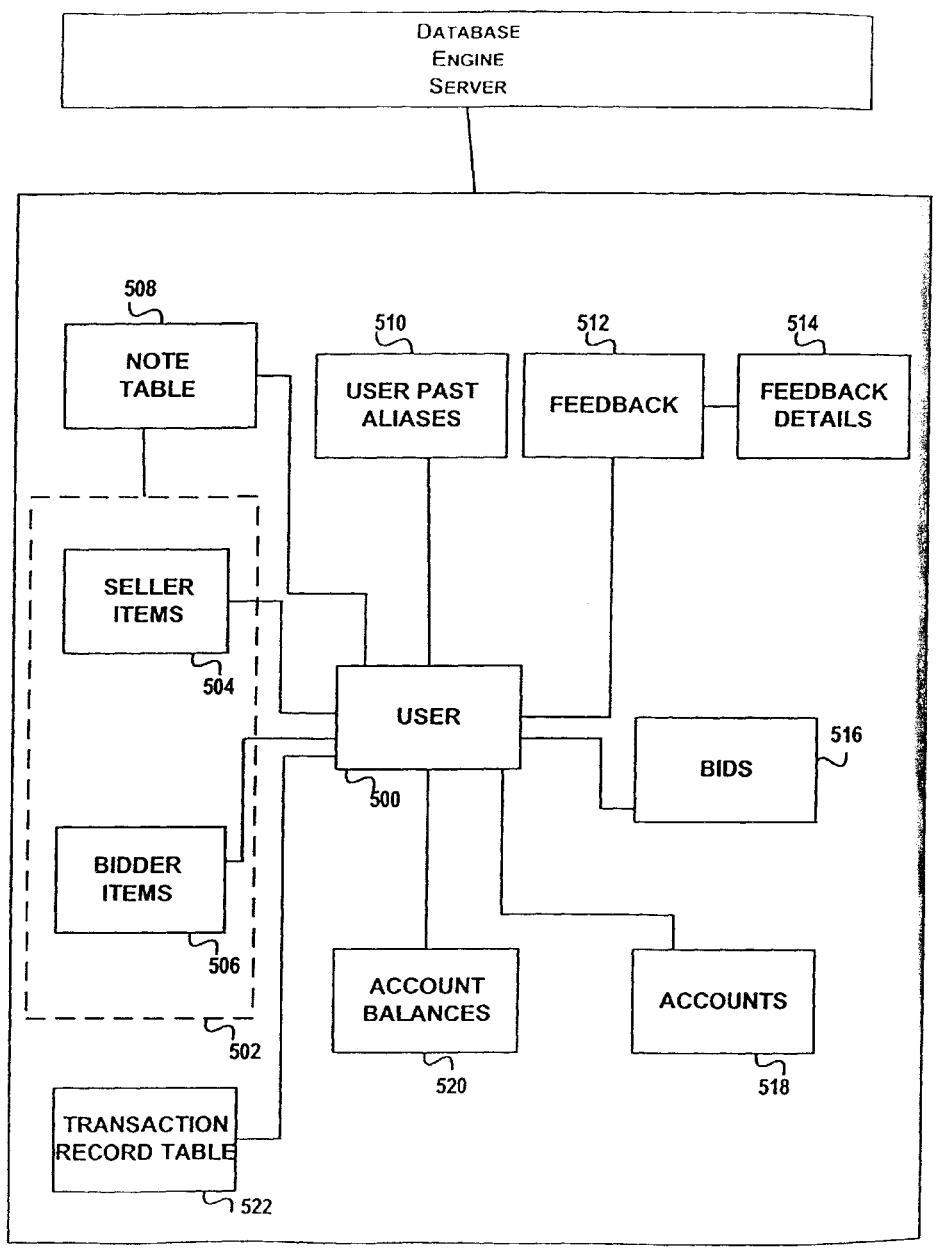
FIG. 5 is an illustration of an exemplary database structure for an auction facility of FIG. 4.

FIG. 5 is a database diagram illustrating an exemplary database 520 maintained by and accessed via the database engine server 514, which at least partially implements and supports the auction facility 400. The database 520 may, in one embodiment, be implemented as a relational database, and includes a number of tables having entries or records that are linked by indices and keys. In an alternative embodiment, the database 514 may be implemented as a collection of objects in an object-oriented database.

Central to the database 520 is a user table 500, which contains a record for each user of the auction facility 400. A user may operate as a seller, buyer, or both within the auction facility 500. The database 520 also includes item tables 502 that may be linked to the user table 500. Specifically, the item tables 502 include a seller items table 504 and a bidder items table 506. A user record in the user table 500 may be linked to multiple items that are being, or have been, auctioned via the facility 400. A link indicates whether the user is a seller or a bidder (i.e., buyer) with respect to items for which records exist within the item tables 502.

The database 414 also includes a note table 508 populated with note records that may be linked to one or more item records within the item tables 502 and/or to one or more user records within the user table 500. Each note record within the note table 508 may include, inter alia, a description, history or other information pertaining to an item being auctioned via the auction facility 400 or to a user of the auction facility 400.

Also linked with the user table is one or more feedback tables 512 which contain information about comments made by and about each user of the auction facility 400. It is within this set of tables that indicators that are linked to the predefined comments about a particular user are stored. Additionally, each indicator may be cross-referenced with regard to the transaction number to which the comment relates, as well as the user who made the comment.

A number of other tables may be linked to the user table 500 including, but not limited to, a user past aliases table 510, a bids table 516, an accounts table 518, an account balances table 520, and a transaction record table 522.

An Exemplary Feedback Forum Methodology

Figure 6A:
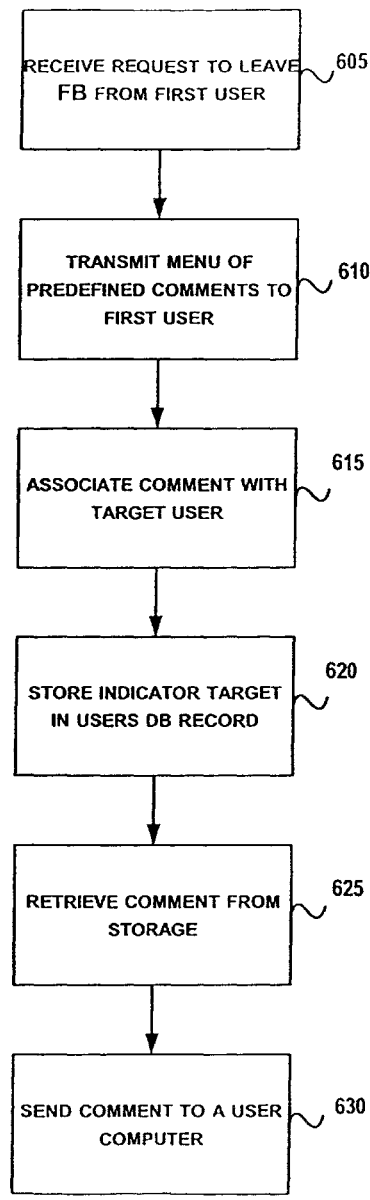
FIGS. 6A and 6B are a flowcharts listing an exemplary methodology for operating a feedback forum.
Figure 6B:
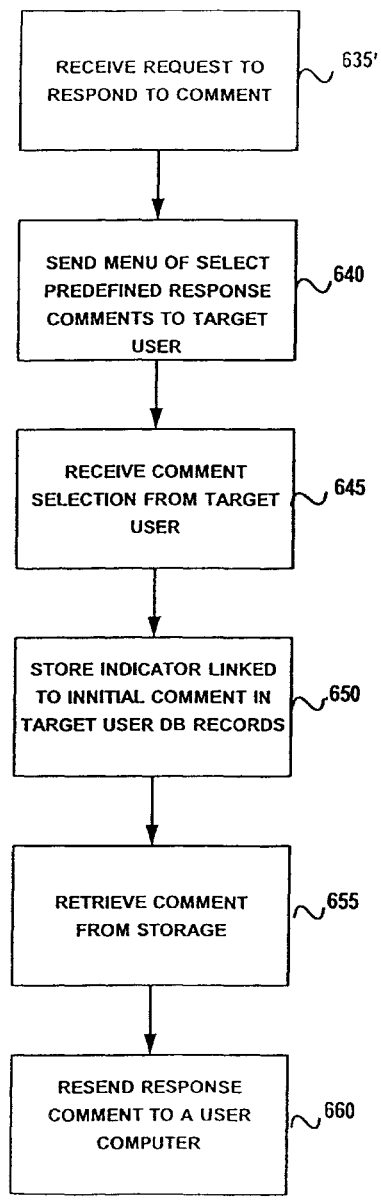

FIGS. 6A and 6B are flow diagrams illustrating an exemplary methodology 600 for a feedback forum in which comments may be left for users of an e-commerce system such as the Internet auction facility 400 described supra. It is to be noted that embodiments of the invention are not limited to application in online auction environments alone, but may be implemented in any e-commerce system in which users of the system interact.

In block 610 of FIG. 6A, the Internet auction facility 400 receives a request from a user to leave feedback for another user. If the user has just concluded an auction for an item and is either the successful bidder or the seller, he is prompted when viewing the items auction web page to leave feedback for the other user(s) involved in the auction. If the user chooses the prompt, typically displayed as an icon, the Internet auction facility 400 will send the user a markup language feedback forum page for display on the user's computer as indicated in block 610. Alternatively, a user may enter proceed from any-one of the Internet auction facility 400 web pages he is currently viewing into the feedback forum by clicking the appropriate icon or hypertext link.

FIGS. 7A and 7B are illustrations of exemplary feedback forms that may be displayed to the user from which the user may choose a comment. It is understood, however, that many types of alternative feedback forms are contemplated as would be obvious to one skilled in the art with the benefit of this disclosure.

FIG. 7A is a form that may be displayed to a successful bidder. Typically, if the feedback forum is entered from an auction page for a particular item and the successful bidder is already known to the auction facility, the feedback form will be returned with most of the particulars of the auction filled in. If the bidder enters the feedback forum from another link, he may have to fill in the information in the form including his ID and password, the targeted user's ID, and the transaction number to which the comment relates. The form may list the seller of the item as shown in blocks 710 and 723. It may list the item which was the subject of the auction as shown in 720, as well as listing the transaction number of the auction as shown in block 721. The successful bidder would be prompted to enter his user password and user ID (if not already filled in) in blocks 713 and 711 respectively. The form will include a list of predefined comments from which the bidder may pick one comment about the seller (in other embodiments more than one comment may be selected). The comments are contained within three drop-down boxes 730-732, one box containing positive comments, one box for neutral comments, and another for negative comments. In other embodiments, the predefined comments may be listed in any conceivable manner such as, but not limited to, check boxes, single drop-down boxes for all comment types, lists with radio buttons, and list boxes with scroll bars. Once the bidder has selected a comment and entered in his password, he may send the comment to the auction facility for posting by selecting the "Submit Comment" button 840.

Drop-down boxes 830-832 in their expanded form are illustrated in FIG. 8B. A variety of comments are contained within each box. To maintain a level of variety, the auction facility 400 may, on a periodic basis, change the content of the comments available to a user. In some embodiments as shown in blocks 841 and 843, the comments may have fields that fill in the appropriate name of a user and/or item when displayed. Ideally, the predefined comments are written and selected by the auction facility administrators to: (1) minimize potential liability to the auction facility for slander against the target user, and (2) minimize potential criminal and civil liability for publishing language considered inappropriate by the state in which it is viewed.

FIG. 8A is a form that may be displayed to a seller who has just concluded an auction. Typically, if the feedback forum is entered from an auction page for a particular item and the seller is already known to the auction facility, the feedback form will be returned with most of the particulars of the auction filled in. If the seller enters the feedback forum from another link, he may have to fill in the information in the form including his ID and password, the targeted user's ID, and the transaction number to which the comment relates. The form may list the successful bidder for the item as shown in blocks 850 and 863. It may list the item which was the subject of the auction as shown in 860, as well as listing the transaction number of the auction as shown in block 861. The successful bidder would be prompted to enter his user password and user ID (if not already filled in) in blocks 851 and 853 respectively. The form may include a list of predefined comments from which the seller may pick one comment about the successful bidder (in other embodiments more than one comment may be selected). The comments are contained within three drop-down boxes 870-872, one box containing positive comments, one box for neutral comments, and another for negative comments. A variety of comment s may be contained within each of the boxes as shown in FIG. 8B and the comments may include fields that substitute the name of the item or user when being displayed. In other embodiments, the predefined comments may be listed in any conceivable manner such as, but not limited to, check boxes, single drop-down boxes for all comment types, lists with radio buttons, and list boxes with scroll bars. Once the seller has selected a comment and entered in his password, he may send the comment to the auction facility for posting by selecting the "Submit Comment" button 880.

In one embodiment of the invention, the forms of FIGS. 7A and 8A including the predefined comments are displayed in a user's preferred language or a default language associated with a user. The display language may be determined based on a registered user's listed language preference, or it may be based on the language of the state associated with the site through which the user is registered. Because the comments are predefined, identical versions of the comments may be provided in a variety of language choices.

Referring to FIG. 6A, after the comment is received by the Auction facility 400, it is associated with the target user in block 615. Additionally, in alternative embodiments the comment may also be associated with transaction record and/or the user making the comment. In a preferred embodiment, the comment is only stored in one or at most a few locations within mass storage of the Internet auction facility 400. In block 620, a pointer or indicator unique to the comment along with additional information relating to the user commenting and the transaction involved are stored within the targeted users database record.

After the comment has been stored with the targeted user's database record, it may be retrieved for viewing. Typically, any user of the auction facility can access a listing of comments made about a particular user through links provided throughout web pages associated with the auction facility 400. When a request is made to see the comments about a targeted user, the comment indicators stored within the targeted user's database record are retrieved. The comments associated with the indicators are then retrieved from storage as shown in block 625 in the preferred or default language of the user requesting to view the comments. The comments are then transmitted to the user in a format similar to the format presented in prior art FIG. 1 for display.

In the preferred embodiment, the targeted user may respond to a comment made about him. FIG. 6B is a flow chart showing the methodology followed by an exemplary feedback forum when a target user requests to respond to a comment about him. The forum receives the request to respond in block 635. In block 640, a response comment form such as the one illustrated in FIG. 8 is sent to the target user for display on his computer. If the targeted user is known (i.e., he has signed in with the auction facility), the form, the comment to which he is responding and the predefined response comment choices will all be displayed in the user's preferred language. Alternatively, the form and associated predefined comments may be displayed in the default language associated with the domain suffix of the national site through which he entered the auction facility (e.g., auctionfacilify.jp.com would indicate that the form should be displayed in Japanese).

The representative response comment form as shown in FIG. 9 is similar to the forms of FIGS. 7A and 8A except for the choices of predefined comments available to the targeted user. In a preferred embodiment, the list of predefined response comments 910 relate directly to the nature of the comment 905 made about the targeted user. For instance, if the comment left about the targeted user was that the item he sold was packaged improperly, then the response comments might respond only to the manner in which the item was packaged. Once the targeted user has chosen a response comment, he may send it to the auction facility by clicking the "Submit Response" button.

Upon receipt of the response comment choice as shown in block 645 of FIG. 6B, an indicator for the response comment is linked to the comment to which it is a response and stored in the targeted user's database record in 650. At the request of a user to view the comment written about the targeted user, the response comment is retrieved from storage based on its indicator along with the related comment and displayed to the user in the language associated with the user in block 655 and 660. Typically, the response comments will be displayed next to or underneath the comment to which it relates.

In the preferred embodiment, the commenting user is given an opportunity to respond to the targeted user's response to his initial comment. The methodology involved in such a response is similar to that discussed above in reference to FIG. 6B.

An Alternative Feedback Forum Methodology

In some instances, it may be desirable to retain the free-form comment methodology currently utilized in the prior art. Limiting a user's comments to only predefined choices is somewhat restrictive and may not in many cases provide the degree of information content that a free-form comment might. For example, a free-form comment expressing rage and dissatisfaction, perhaps through the use of profanity or other strong words, might act as a stronger deterrent to a prospective bidder from bidding on a product being auctioned by the user about whom the comment was left than a rather sanitized comment stating the condition of an item was less than what it was represented as.

On the other hand, any advantages that may be associated with free-form comments may be outweighed by the detrimental effects related to the content of the free-form comments. For example, the auction facility may be liable for slander to a user resident of certain jurisdictions having strict slander laws. Additionally, in certain states such as certain Islamic nations, the auction facility may be subject to civil and criminal penalties for publishing comments with content that is considered inappropriate in those states.

Figure 10:
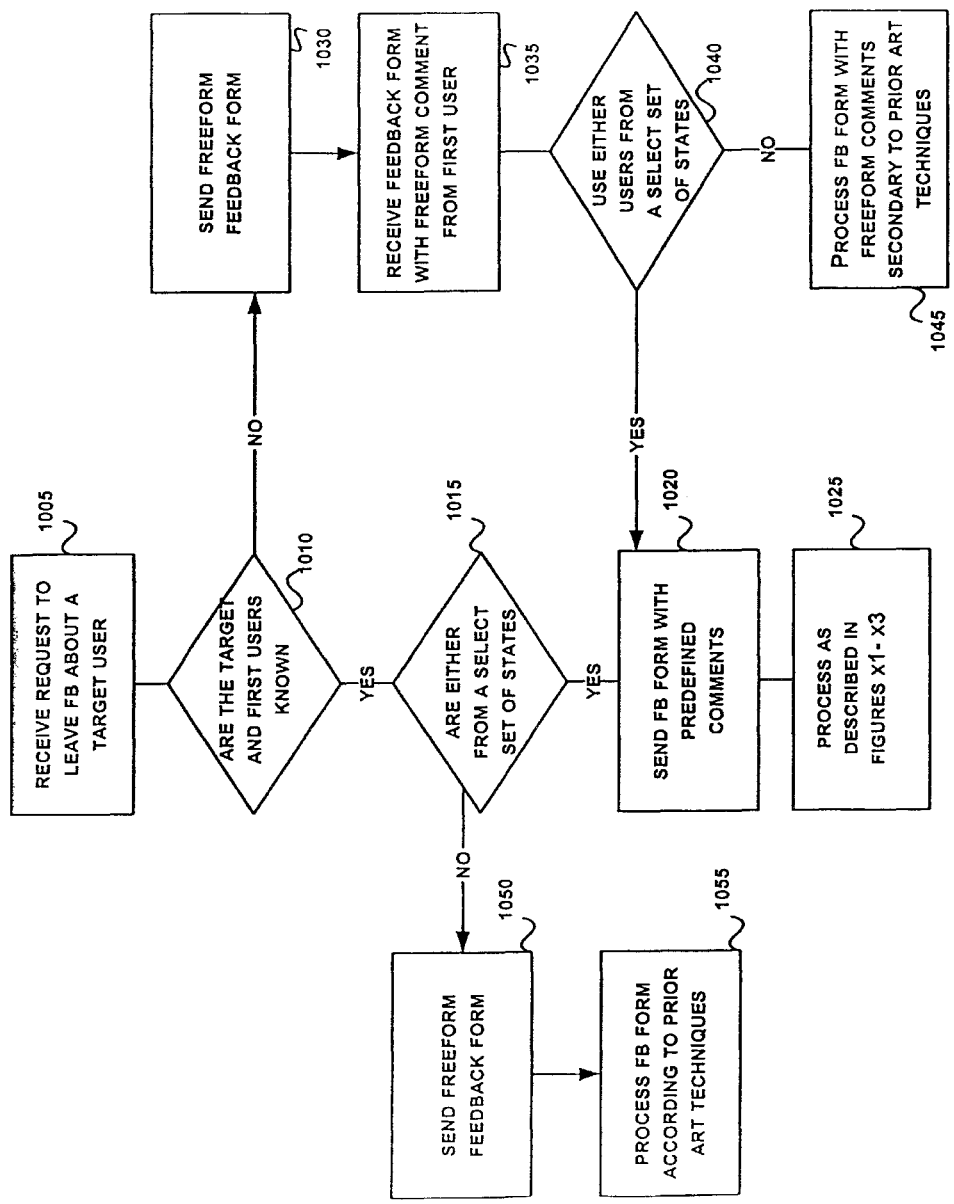
FIG. 10 is a flowchart illustrating an alternative methodology of operating a feedback forum that incorporates both freeform and predefined feedback comments.

The FIG. 10 is a flow chart of a method of operating a feedback forum in which a user is able to leave a free-form comment unless he or the target user of the comment are residents or are associated with states in which publishing free-form comments may subject the auction facility to civil or criminal liability. In FIG. 10, the default behavior of the feedback forum is to allow the user to leave a free-form comment, however a feedback forum in which the default behavior allows the user to leave predefined comments is also contemplated unless if is verified the commenting user and the targeted user are from certain states.

In block 1005, the auction facility receives a request from a user to leave a comment about a targeted user. In block 1010, the auction facility system determines whether the commenting user and the targeted user are known. For instance, if the commenting user is a seller, he may click on a leave a comment button from within a transaction page for an item he has auctioned. In this case, the system would know the names of the users and the particular transaction number related to the item. Assuming the names of the users are known, the system determines whether either user is from a select set of states with strict slander or content laws in block 1015. If either user is from or associated with the select set of states, the user is sent a feedback form with predefined comment choices in block 1020. A typical form would be similar to the illustration of FIG. 7A. The feedback processing would then follow the processing as described supra with regard to FIGS. 6A and 6B as indicated in block 1025.

Referring back to block 1010, if the system is unable to verify the identities of either user as would be the case if the commenting user entered the feedback forum from a link other than the link listed on a page related to a particular auction, the user is sent the standard free-form feedback form as shown in prior art FIG. 2. After the user fills out the form by entering the free-form comment, his ID and password, the ID of the target of the comment, and the item transaction number, and sends the form to the auction facility, the auction facility system determines whether either identified user is from the select set of states in block 1040. If either is, the user is sent a feedback form with predefined comment choices as illustrated in FIG. 7A. If neither is from the select set of states, the comments are posted to the target user's database record for review by other users as indicated in block 1045.

Referring back to block 1015, if the neither user is from the select set of states, the FIG. 2 free-form feedback form is sent to the user and is processed using prior art techniques as indicated in blocks 1050 and 1055.

In the foregoing specification, the invention has been described with reference to specific embodiments thereof. It will, however, be evident that various modifications and changes may be made thereto without departing from the broader spirit and scope of the invention. For instance, in the embodiments of the invention described above, markup language documents are utilized in the display of comments and comment selection options to the client, it is to be noted that other types of interfaces visual or audio are contemplated as would be obvious to one skilled in the art. Furthermore, the embodiments have been described in terms of an auction facility, however it is contemplated that the feedback forum might be utilized in other types of e-commerce forums where information about users of the system would be useful. The specification and drawings are, accordingly, to be regarded in an illustrative rather than a restrictive sense.

What is claimed is:

1. A computer-implemented method comprising:

accessing a predefined comment applicable from a first user of a network-based transaction system to a second user, the predefined comment including a predefined word in a first language of a plurality of languages supported by a network-based transaction system used to process a transaction between the first user and the second user, the predefined word being applicable to the second user;

generating a modified comment based on the predefined comment, the modified comment being a version of the predefined comment and including a modified word in a second language of the plurality of languages, the second language being distinct from the first language, the modified comment being applicable to the second user;

presenting the modified comment as selectable by the first user as a statement of an opinion held by the first user regarding the transaction between the first user and the second user, the presenting being to the first user and performed by a processor of a machine;

receiving a selection from the first user, the selection indicating that the modified comment is selected by the first user as the statement of the opinion held by the first user regarding the transaction between the first user and the second user; and storing an indicator of the predefined comment in a feedback table of the network-based transaction system, the indicator identifying the predefined comment among a plurality of predefined comments available from the network-based transaction system, the feedback table storing indicators of predefined comments applied to the second user, the storing of the indicator being in response to the receiving of the selection from the first user.

2. The computer-implemented method of claim 1, wherein:

the generating of the modified comment generates the modified comment to include a name of an item;

the item is a subject of the transaction between the first user and the second user;

the network-based transaction system includes an item table to store a plurality of names including the name of the item and corresponding respectively to a plurality of items including the item; and the method further comprises accessing the item table.

3. The computer-implemented method of claim 1, wherein the generating of the modified comment generates the modified comment to include a name of the second user.

4. The computer-implemented method of claim 1 further comprising determining the second language based on at least one of:
a language preference of the first user, or
a geographical region corresponding to the first user.

5. The computer-implemented method of claim 1 further comprising:

generating a transaction number of the transaction between the first user and the second user, the transaction number specifying the transaction among a plurality of transactions processed using the network-based transaction system; and storing the transaction number with the indicator of the predefined comment in the feedback table of the network-based transaction system; and wherein the network-based transaction system includes a transaction table to store a plurality of transaction numbers respectively corresponding to the plurality of transactions.

6. The computer-implemented method of claim 1 further comprising storing a name of the first user with the indicator of the predefined comment in the feedback table of the network-based transaction system; wherein the network-based transaction system includes a user table to store a plurality of names respectively corresponding to a plurality of users including the first user and the second user.

7. The computer-implemented method of claim 1, wherein the generating of the modified comment is responsive to reception of a request from the first user, the request being to submit feedback regarding the transaction between the first user and the second user.

8. The computer-implemented method of claim 7 further comprising prompting the first user to submit feedback regarding the transaction between the first user and the second user.

9. The computer-implemented method of claim 8, wherein the prompting of the first user includes displaying an icon as a prompt to submit the feedback.

10. The computer-implemented method of claim 8, wherein:

the prompting of the first user occurs subsequent to a conclusion of an auction for an item; and the item is a subject of the transaction between the first user and the second user.

11. The computer-implemented method of claim 1 further comprising:

retrieving the indicator of the predefined comment from the feedback table;

presenting the predefined text to a third user as feedback submitted by the first user regarding the transaction between the first user and the second user; wherein the presenting of the predefined text to the third user is based on the indicator of the predefined comment.

12. The computer have implemented method of claim 11, wherein the retrieving of the indicator is in response to reception of a request from the third user, the request being to view feedback regarding the second user.

13. A system comprising:

a database engine server having one or more processors, the database engine server being configured to:

access a predefined comment applicable from a first user of the network-based transaction system to a second user, the predefined comment including a predefined word in a first language of a plurality of languages supported by a network-based transaction system used to process a transaction between the first user and the second user, the predefined word being applicable to the second user;

generate a modified comment based on the predefined comment, the modified comment being a version of the predefined comment and including a modified word in a second language of the plurality of languages, the second language being distinct from the first language, the modified comment being applicable to the second user;

present the modified comment as selectable by the first user as a statement of an opinion held by the first user regarding the transaction between the first user and the second user;

receive a selection from the first user, the selection indicating that the modified comment is selected by the first user as the statement of the opinion held by the first user regarding the transaction between the first user and the second user; and store an indicator of the predefined comment in a feedback table of the network-based transaction system, the indicator identifying the predefined comment among a plurality of predefined comments available from the network-based transaction system, the feedback table storing indicators of predefined comments applied to the second user, the indicator being stored in response to reception of the selection from the first user; and a database communicatively coupled to the database engine server, the database including the feedback table.

14. The system of claim 1, wherein:
the database engine server is configured to generate the modified comment to include a name of an item;
the item is a subject of the transaction between the first user and the second user;
the database includes an item table to store a plurality of names including the name of the item and corresponding respectively to a plurality of items including the item; and
the database engine server is further configured to access the item table.

15. The system of claim 13, wherein:
the database engine server is further configured to:
generate a transaction number of the transaction between the first user and the second user, the transaction number specifying the transaction among a plurality of transactions processed using the network-based transaction system; and
store the transaction number with the indicator of the predefined comment in the feedback table of the network-based transaction system; and
the database includes a transaction table to store a plurality of transaction numbers respectively corresponding to the plurality of transactions.

16. The system of claim 13, wherein:
the database engine server is further configured to store a name of the first user with the indicator of the predefined comment in the feedback table of the network-based transaction system; and
the database includes a user table to store a plurality of names respectively corresponding to a plurality of users including the first user and the second user.

17. The system of claim 13, wherein
the database engine server is further configured to:
prompt the first, user to submit, feedback regarding the transaction between the first user and the second user;
receive a request from the first user, the request being to submit feedback regarding the transaction between the first, user and the second user; and
generate the modified comment in response to the request.

18. The system of claim 13, wherein:
the database engine server is further configured to:
receive a request from a third user, the request being to view feedback regarding the second user;
retrieve the indicator of the predefined comment from the feedback table; and
present the predefined text to the third user as feedback submitted by the first user regarding the transaction between the first, user and the second user, the presenting of the predefined text to the third user being based on the indicator of the predefined comment.

19. A non-transitory machine-readable storage medium comprising instructions that, when executed by one or more processors of a machine, cause the machine to operations comprising:
accessing a predefined comment applicable by a first user of a network-based transaction system to a second user, the predefined comment including a predefined word in a first language of a plurality of languages supported by a network-based transaction system used to process a transaction between the first user and the second user, the predefined word being applicable to the second user;
generating a modified comment based on the predefined comment, the modified comment being a version of the predefined comment and including a modified word in a second language of the plurality of languages, the second language being distinct from the first language, the modified comment being applicable to the second user;
presenting the modified comment as selectable by the first user as a statement of an opinion held by the first user regarding the transaction between the first user and the second user, the presenting being to the first user;
receiving a selection from the first user, the selection indicating that the modified comment is selected by the first user as the statement of the opinion held by the first user regarding the transaction between the first user and the second user; and
storing an indicator of the predefined comment in a feedback table of the network-based transaction system, the indicator identifying the predefined comment among a plurality of predefined comments available from the network-based transaction system, the feedback table storing indicators of predefined comments applied to the second user, the storing of the indicator being in response to the receiving of the selection from the first user.

20. The non-transitory machine-readable storage medium of claim 19, wherein the operations further comprise:
determining the second language based on at least one of:
a language preference of the first user, or
a geographical region corresponding to the first user.

* * * * *

UNITED STATES PATENT AND TRADEMARK OFFICE
CERTIFICATE OF CORRECTION

PATENT NO. : 9,015,585 B2  Page 1 of 1
APPLICATION NO. : 13/722739
DATED : April 21, 2015
INVENTOR(S) : Barry Boone It is certified that error appears in the above-identified patent and that said Letters Patent is hereby corrected as shown below:

In the claims

In column 11, line 46-47, in Claim 2, after "comprises", insert --:--, therefor

In column 11, line 53, in Claim 4, after "comprising", insert --:--, therefor

In column 12, line 6, in Claim 6, after "comprising", insert --:--, therefor

In column 12, line 14, in Claim 7, after "wherein", insert --:--, therefor

In column 12, line 20, in Claim 8, after "comprising", insert --:--, therefor

In column 13, line 49, in Claim 17, after "wherein", insert --:--, therefor

In column 13, line 51, in Claim 17, delete "first," and insert --first--, therefor In column 13, line 51, in Claim 17, delete "submit," and insert --submit--, therefor In column 13, line 55, in Claim 17, delete "first," and insert --first--, therefor In column 14, line 11, in Claim 18, delete "first," and insert --first--, therefor Signed and Sealed this
Twenty-fourth Day of November, 2015

Michelle K. Lee
*Director of the United States Patent and Trademark Office*